(12) United States Patent
Shinzato

(10) Patent No.: US 12,066,598 B2
(45) Date of Patent: Aug. 20, 2024

(54) OPTICAL SYSTEM, LENS APPARATUS, AND IMAGE CAPTURING APPARATUS

(71) Applicant: CANON KABUSHIKI KAISHA, Tokyo (JP)

(72) Inventor: Yuki Shinzato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 271 days.

(21) Appl. No.: 17/667,919

(22) Filed: Feb. 9, 2022

(65) Prior Publication Data

US 2022/0252840 A1 Aug. 11, 2022

(30) Foreign Application Priority Data

Feb. 9, 2021 (JP) ................. 2021-019102

(51) Int. Cl.
*G02B 13/00* (2006.01)
*G02B 9/12* (2006.01)

(52) U.S. Cl.
CPC .......... *G02B 13/0035* (2013.01); *G02B 9/12* (2013.01); *G02B 13/006* (2013.01)

(58) Field of Classification Search
CPC ..... G02B 9/02; G02B 13/006; G02B 13/0035
See application file for complete search history.

(56) References Cited

FOREIGN PATENT DOCUMENTS

| CN | 105739069 A | 7/2016 |
|---|---|---|
| CN | 110221417 A | 9/2019 |
| CN | 111142246 A | 5/2020 |
| JP | 2016139087 A | 8/2016 |
| JP | 2019090948 A | 6/2019 |
| JP | 2019197095 A | 11/2019 |

*Primary Examiner* — Jack Dinh
(74) *Attorney, Agent, or Firm* — Canon U.S.A., Inc. IP Division

(57) ABSTRACT

An optical system includes, in order from an object side to an image side, a first lens unit consisting of one or more negative lenses, a second lens unit with positive refractive power disposed so as to have a first air space from the first lens unit, and a third lens unit disposed so as to have a second air space from the second lens unit. The first air space is a widest air space of air spaces formed closer to the object side than a positive lens disposed closest to the object side in the optical system. A surface of the first lens unit closest to the image side is concave. The third lens unit consists of a lens element with negative refractive power and having a concave surface on the object side. The optical system satisfies predetermined inequalities.

20 Claims, 15 Drawing Sheets

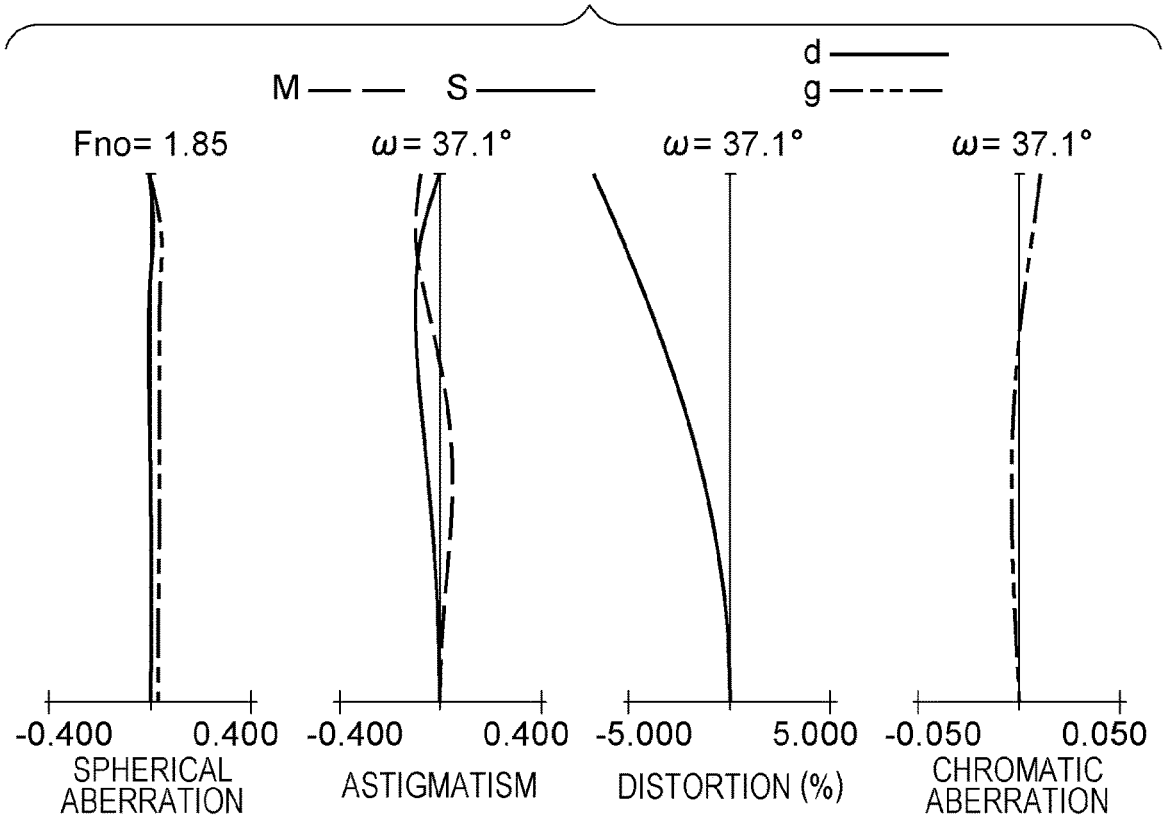
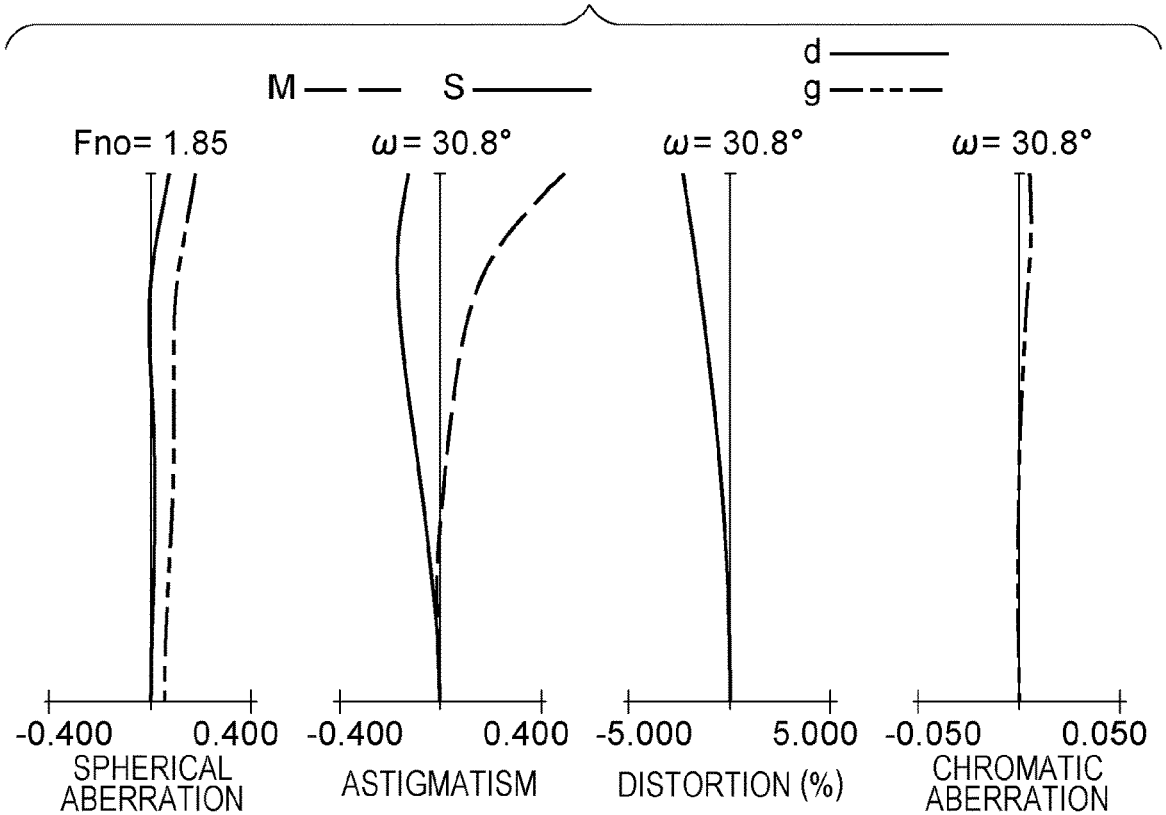

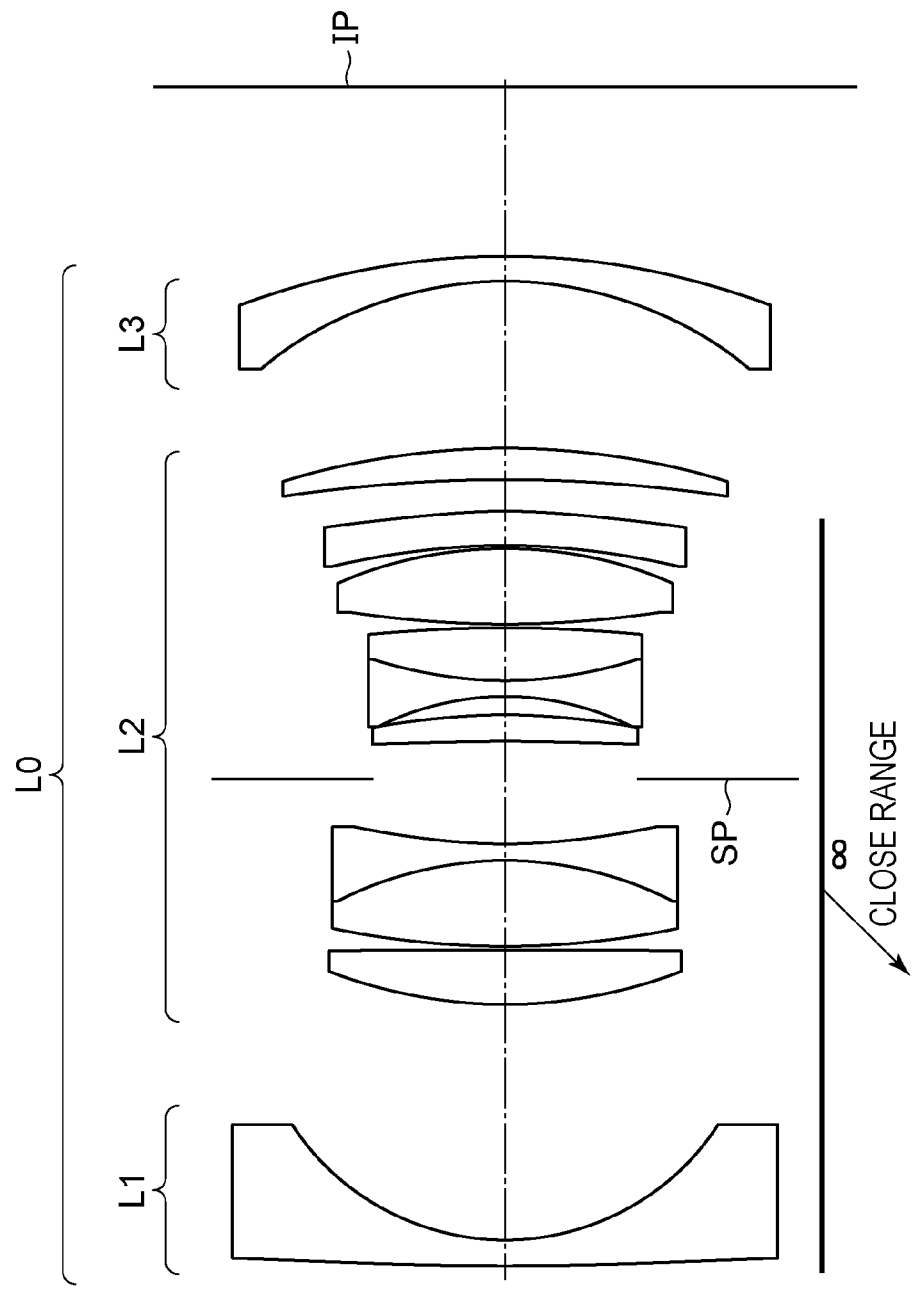

OPTICAL SYSTEM, LENS APPARATUS, AND IMAGE CAPTURING APPARATUS

This application claims the benefit of Japanese Patent Application No. 2021-019102, filed Feb. 9, 2021, which is hereby incorporated by reference herein in its entirety.

BACKGROUND OF THE INVENTION

Field of the Invention

The present disclosure relates to optical systems suitable for image capturing apparatuses such as digital video cameras, digital still cameras, silver-halide cameras, monitoring cameras, and in-vehicle cameras.

Description of the Related Art

Further improvement in performance and miniaturization of Imaging optical systems are required.

Japanese Patent Laid-Open No. 2019-90948 discloses an optical system in which both miniaturization and high performance are aimed even with a high aperture ratio.

Enhancing the performance of an optical system requires increasing the number of lenses constituting the optical system. In contrast, decreasing the entire length of an optical system for miniaturization requires decreasing the distance between the lenses constituting the optical system and the distance between the optical system and the imaging plane. This causes undesirable light (ghosts) generated because of light reflected from each lens surface to be prone to reach the imaging plane.

The optical system disclosed in Japanese Patent Laid-Open No. 2019-90948 has a room for improvement in the viewpoint of reducing undesirable light that reaches an image plane.

Accordingly, the present disclosure provides an optical system with high optical performance that is less affected by undesirable light.

SUMMARY OF THE INVENTION

An optical system according to an aspect of the present disclosure includes, in order from an object side to an image side, a first lens unit consisting of one or more negative lenses, a second lens unit with positive refractive power disposed so as to have a first air space from the first lens unit, and a third lens unit disposed so as to have a second air space from the second lens unit, wherein the first air space is a widest air space of air spaces formed closer to the object side than a positive lens disposed closest to the object side in the optical system, wherein a surface of the first lens unit closest to the image side is concave, wherein the third lens unit consists of a lens element with negative refractive power and having a concave surface on the object side, and wherein the following inequalities are satisfied;

$$0.08 < x1/TTL < 0.35$$

$$0.08 < x2/TTL < 0.25$$

$$0.10 < fL1/fL3 < 0.50$$

where x1 is an on-axis length of the first air space in focusing on an object at infinity, x2 is an on-axis length of the second air space in focusing on an object at infinity, TTL is an overall optical length of the optical system in focusing on an object at infinity, fL1 is a focal length of the first lens unit in focusing on an object at infinity, and fL3 is a focal length of the third lens unit in focusing on an object at infinity.

Further features of the present invention will become apparent from the following description of exemplary embodiments with reference to the attached drawings.

BRIEF DESCRIPTION OF THE DRAWINGS

FIGS. 2A and 2B are aberration charts of the optical system of the first embodiment.

FIG. 9 is a cross-sectional view of an optical system according to a fifth embodiment.

DESCRIPTION OF THE EMBODIMENTS

Figure 1:
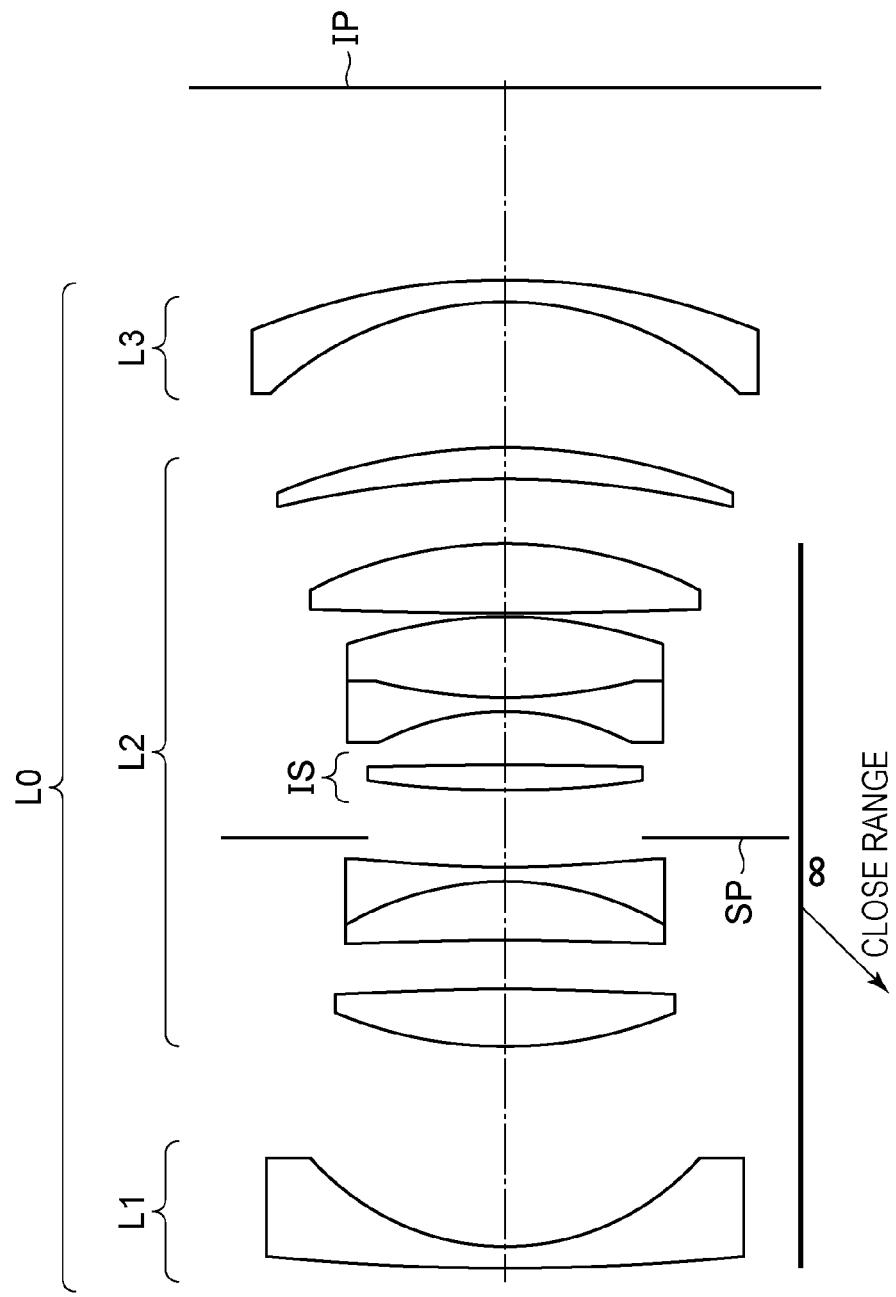
FIG. 1 is a cross-sectional view of an optical system according to a first embodiment.
Figure 3:
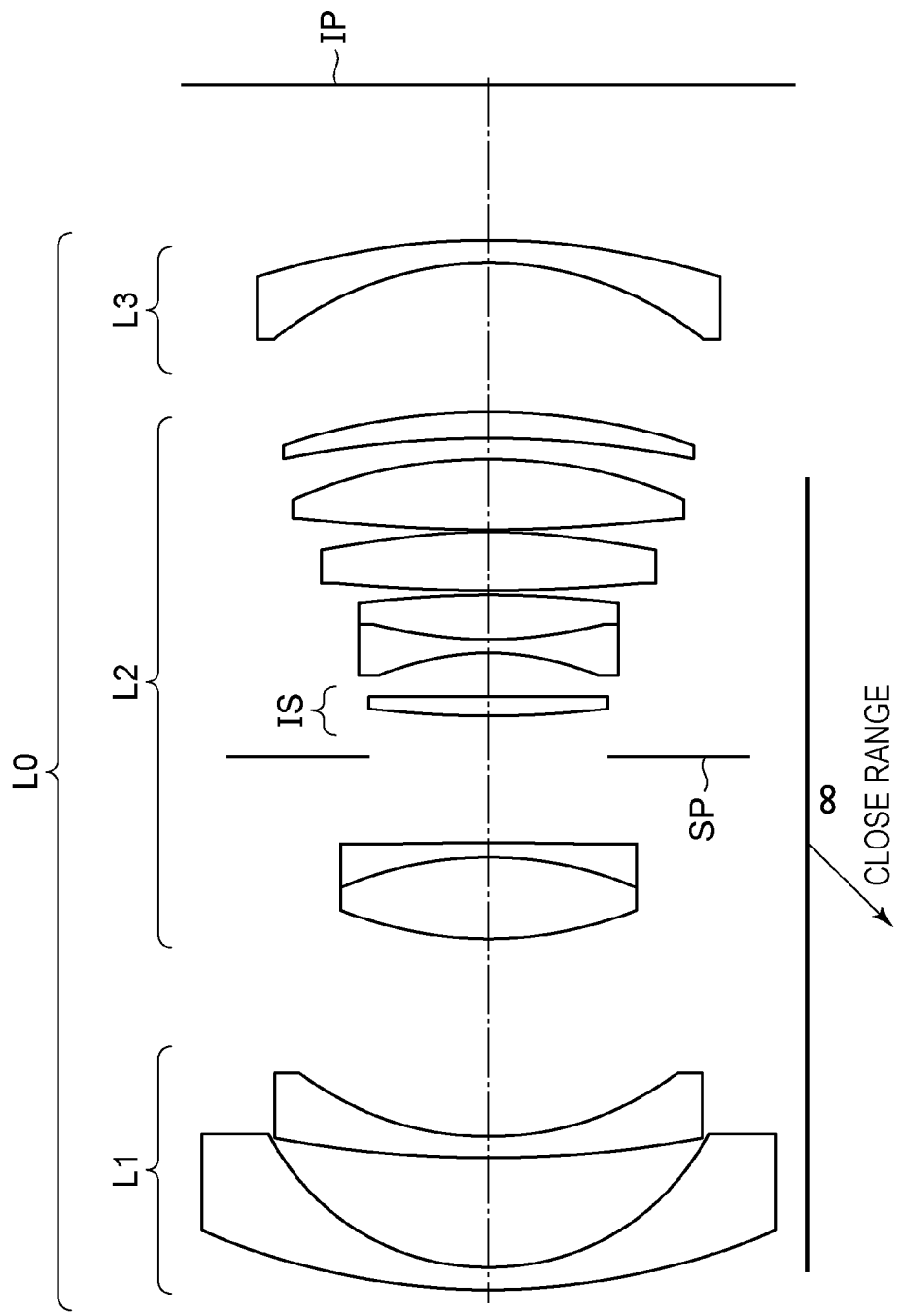
FIG. 3 is a cross-sectional view of an optical system according to a second embodiment.
Figure 4A:
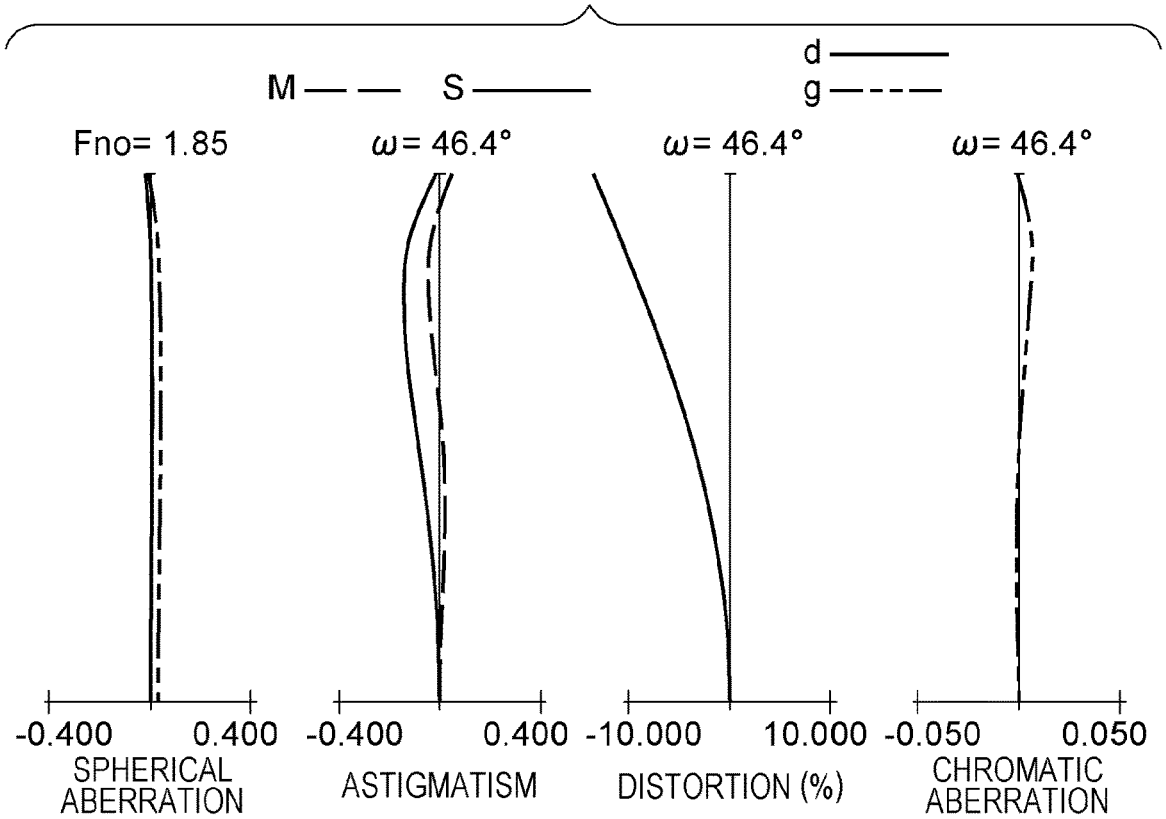
FIGS. 4A and 4B are aberration charts of the optical system of the second embodiment.
Figure 4B:
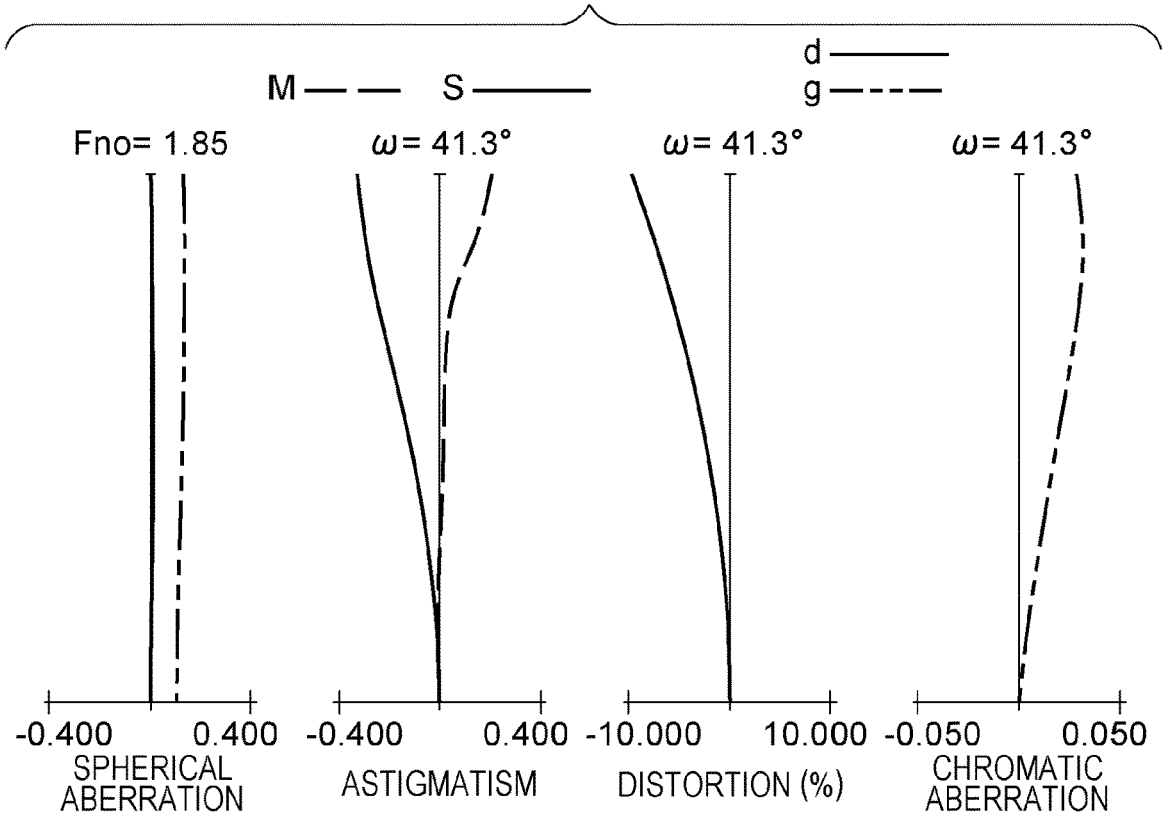
Figure 5:
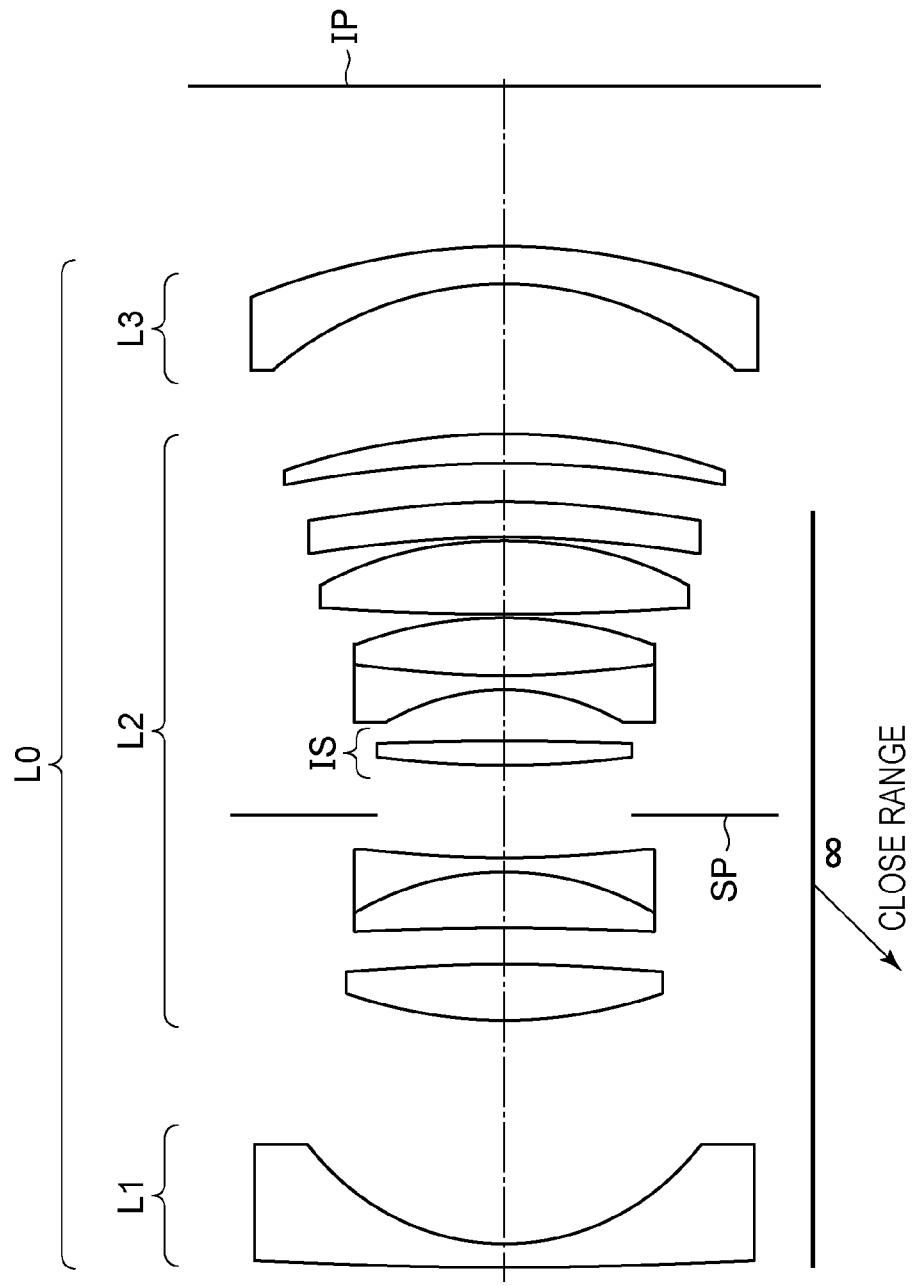
FIG. 5 is a cross-sectional view of an optical system according to a third embodiment.
Figure 6A:
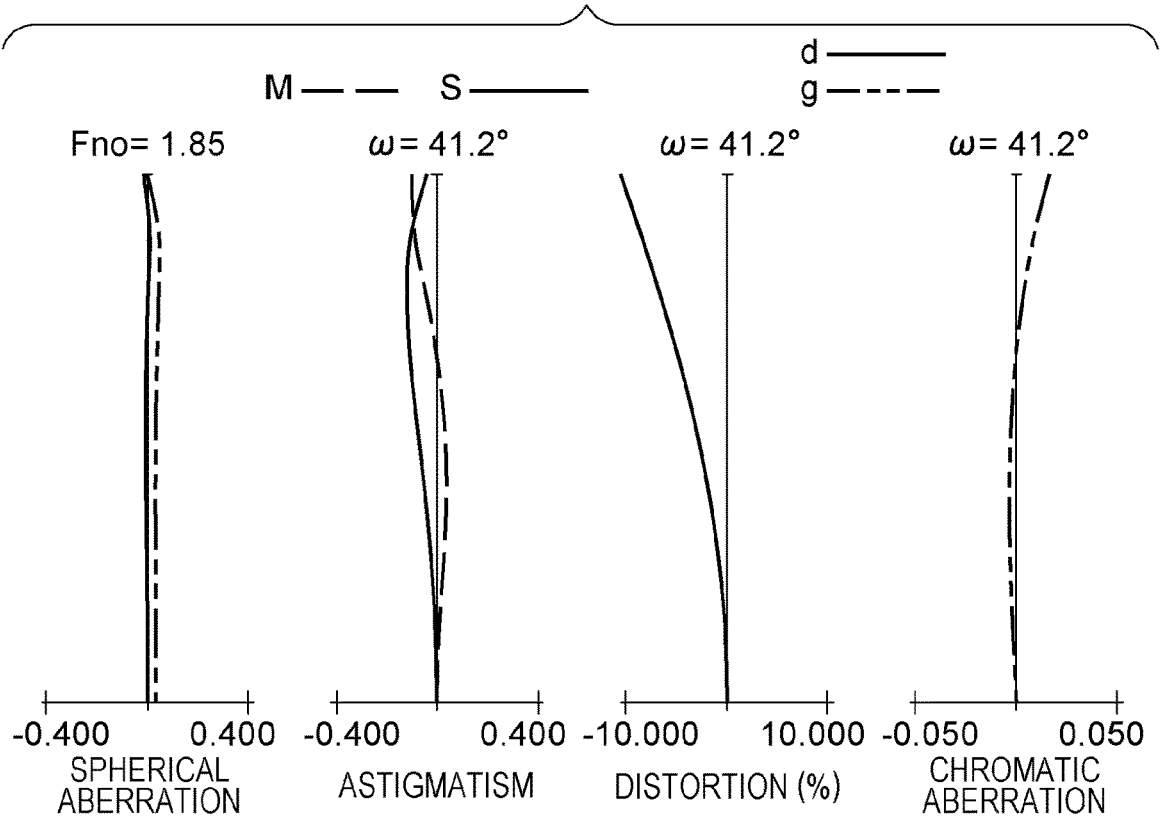
FIGS. 6A and 6B are aberration charts of the optical system of the third embodiment.
Figure 6B:
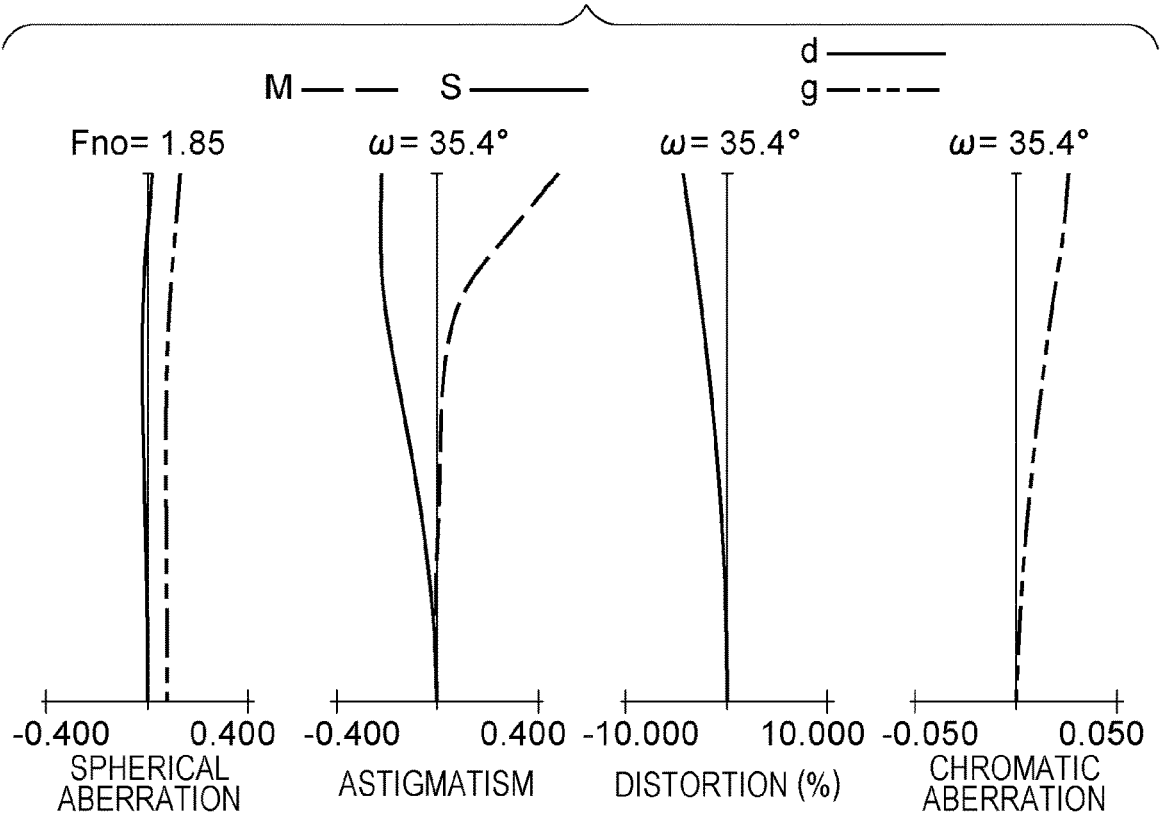
Figure 7:
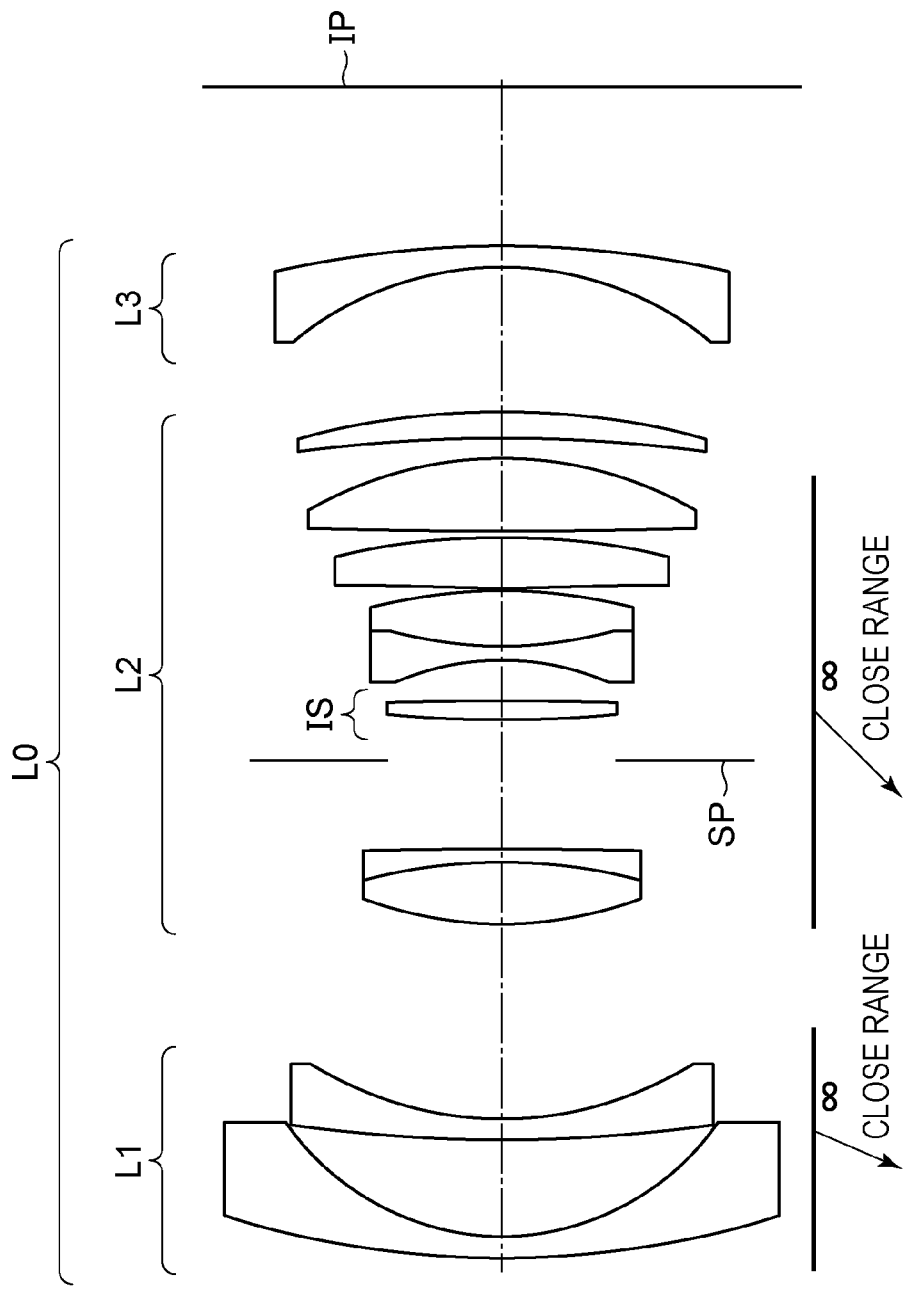
FIG. 7 is a cross-sectional view of an optical system according to a fourth embodiment.
Figure 8A:
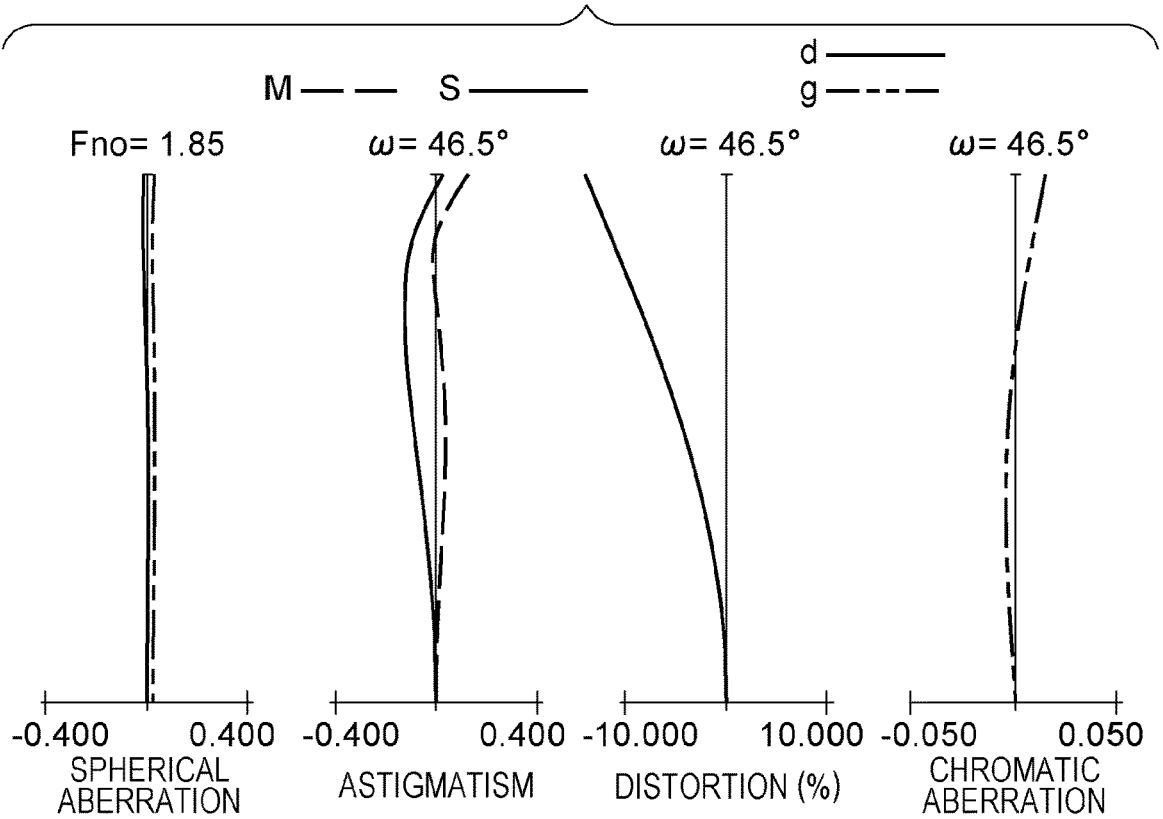
FIGS. 8A and 8B are aberration charts of the optical system of the fourth embodiment.
Figure 8B:
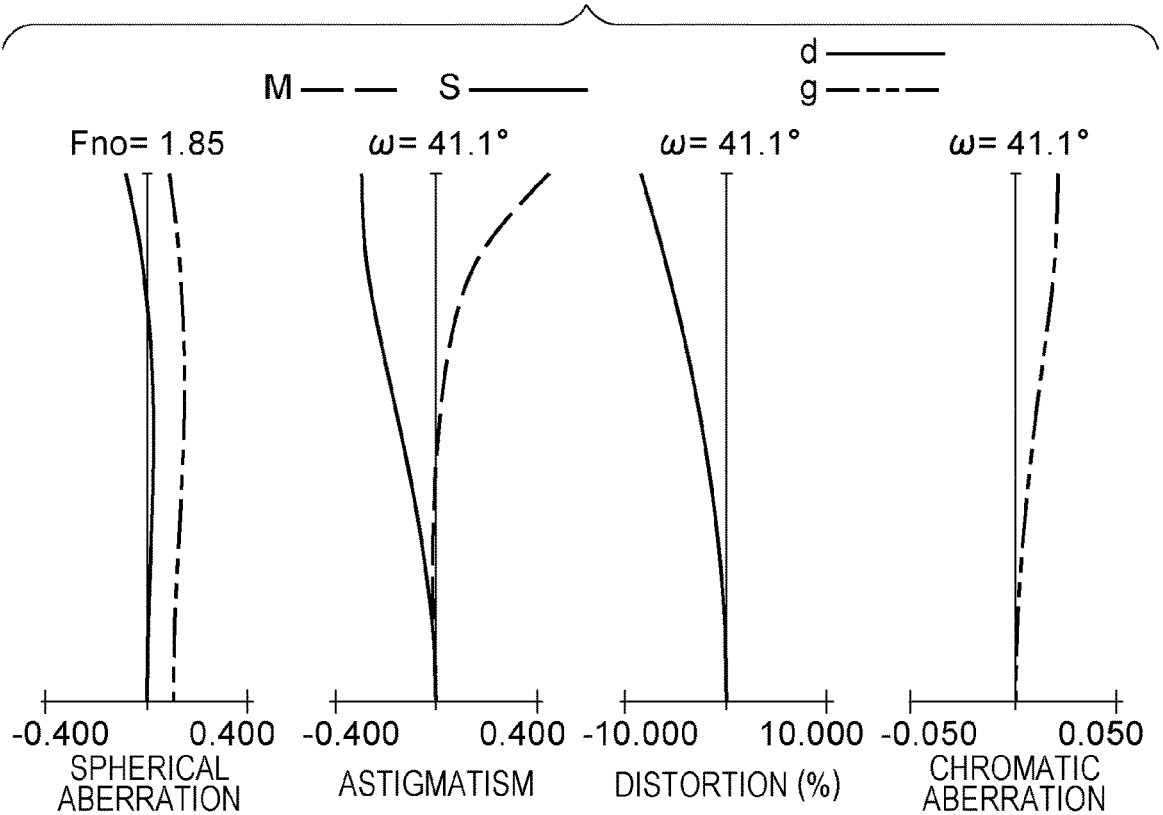
Figure 10A:
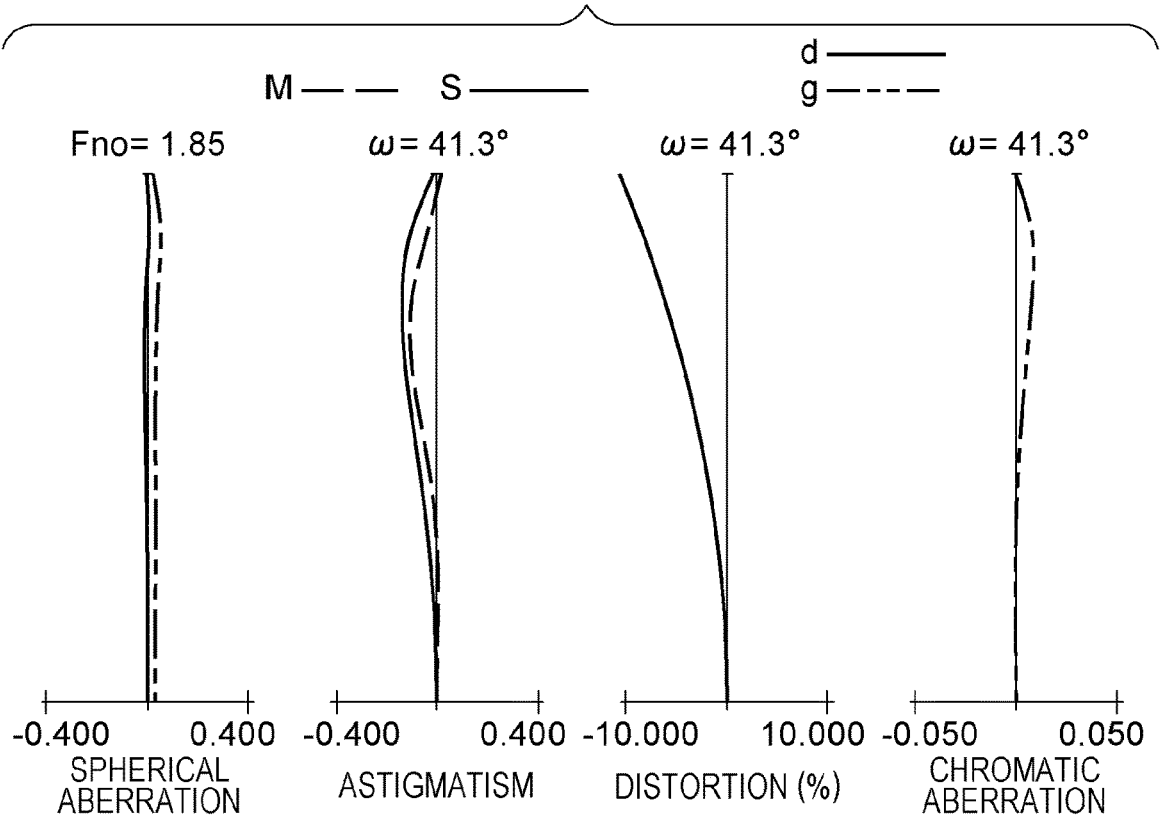
FIGS. 10A and 10B are aberration charts of the optical system of the fifth embodiment.
Figure 10B:
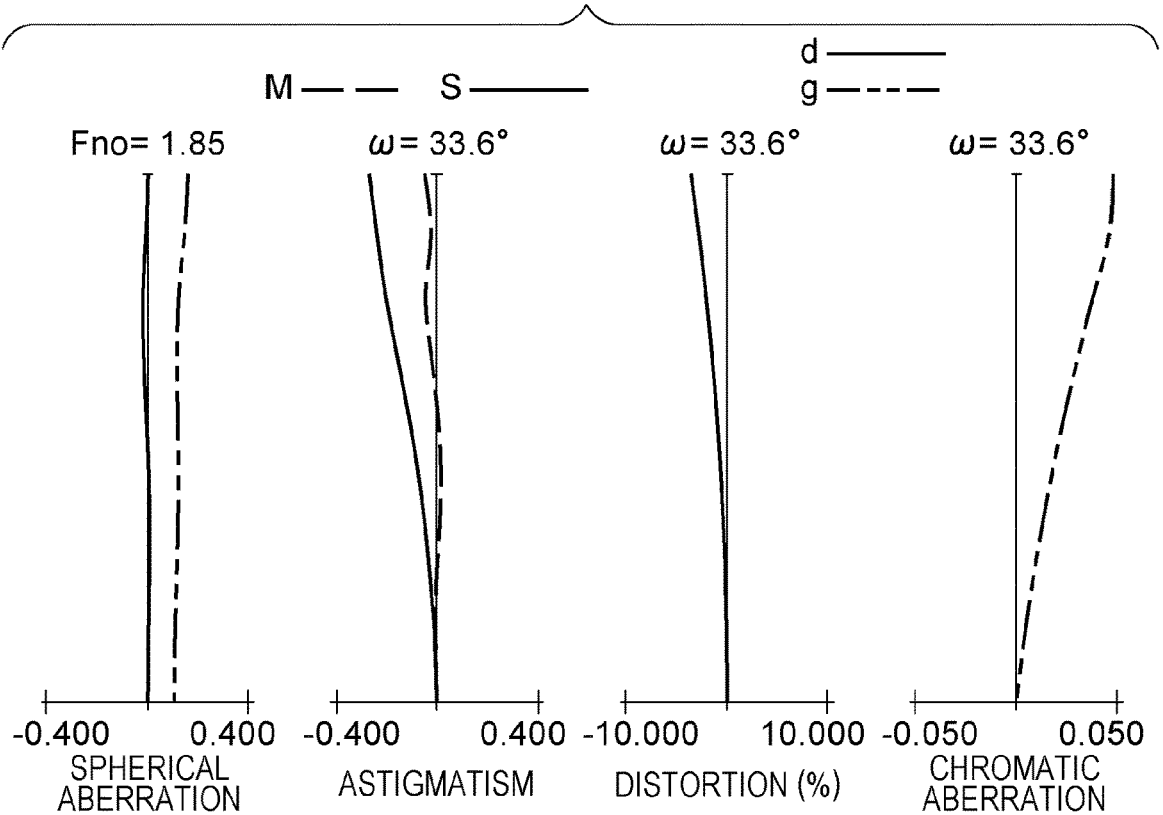
Figure 11:
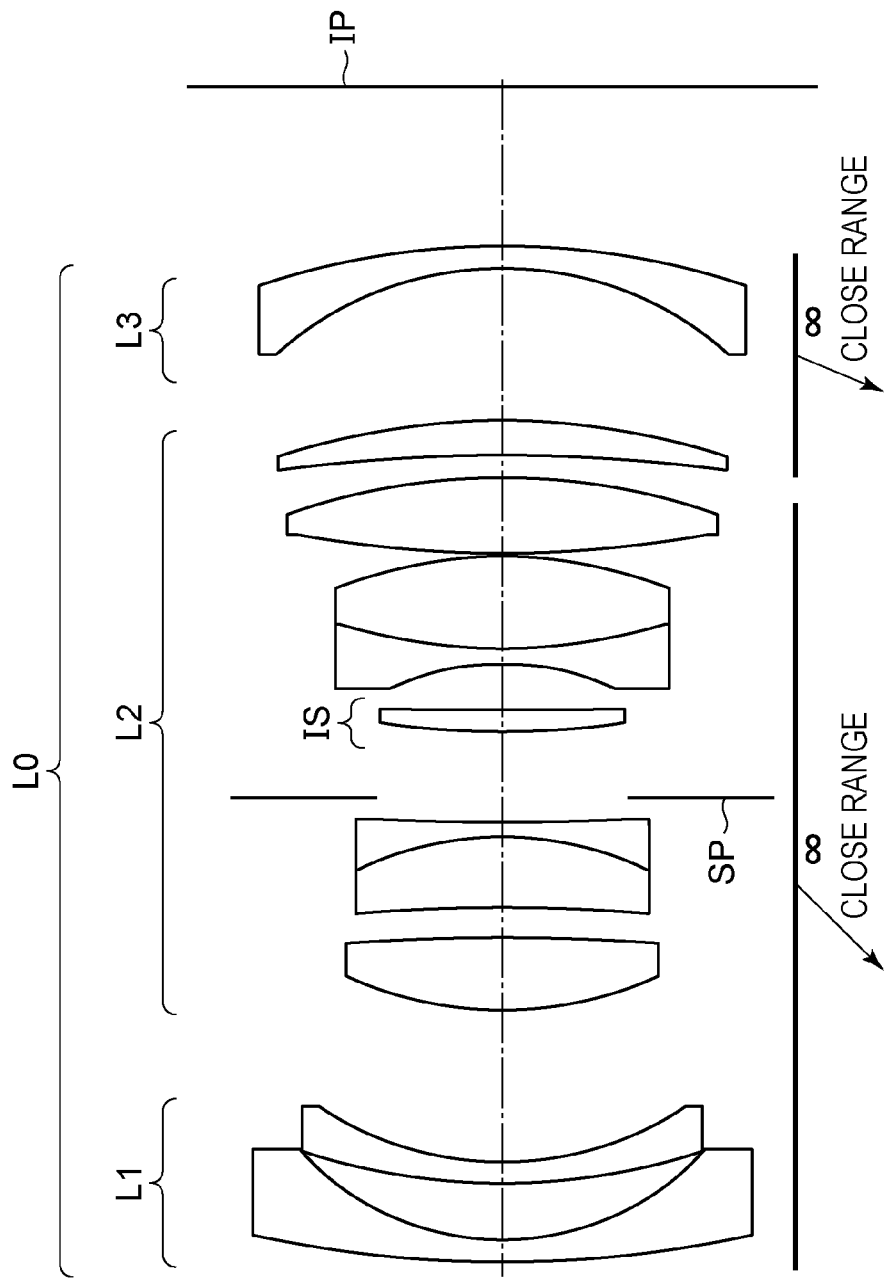
FIG. 11 is a cross-sectional view of an optical system according to a sixth embodiment.
Figure 12A:
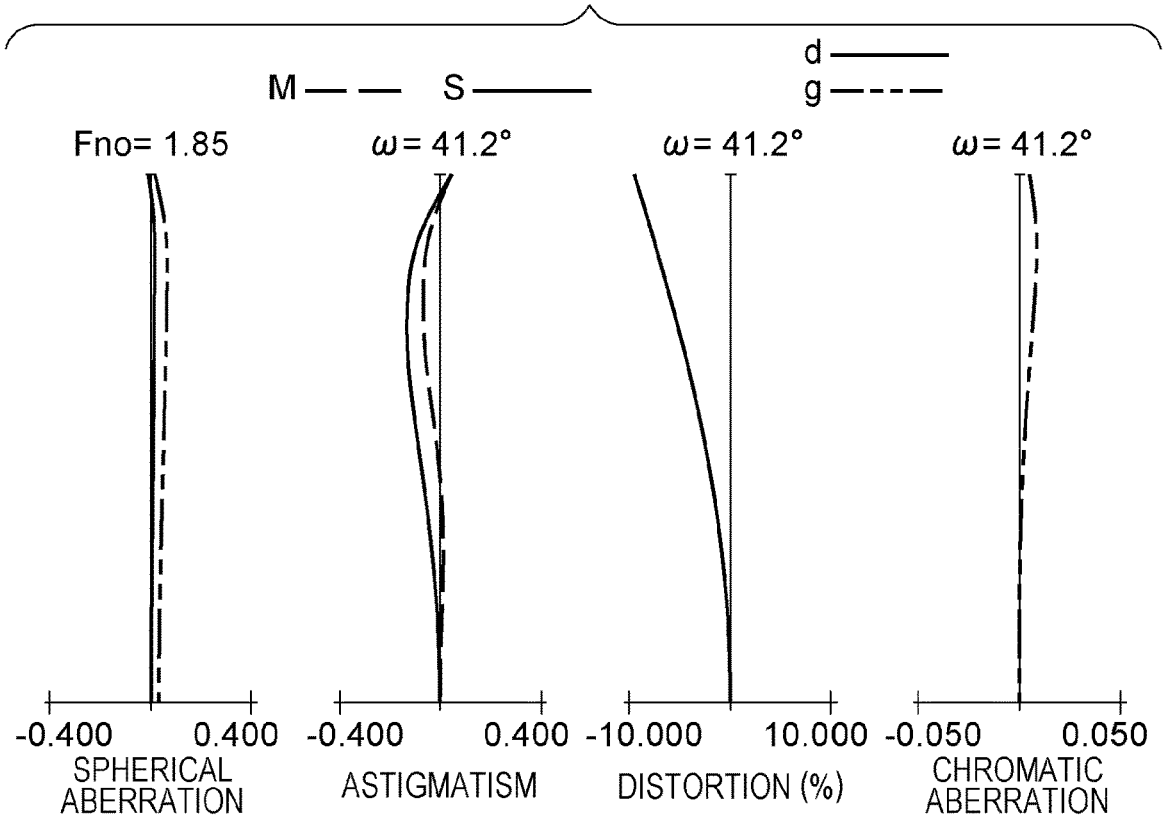
FIGS. 12A and 12B are aberration charts of the optical system of the sixth embodiment.
Figure 12B:
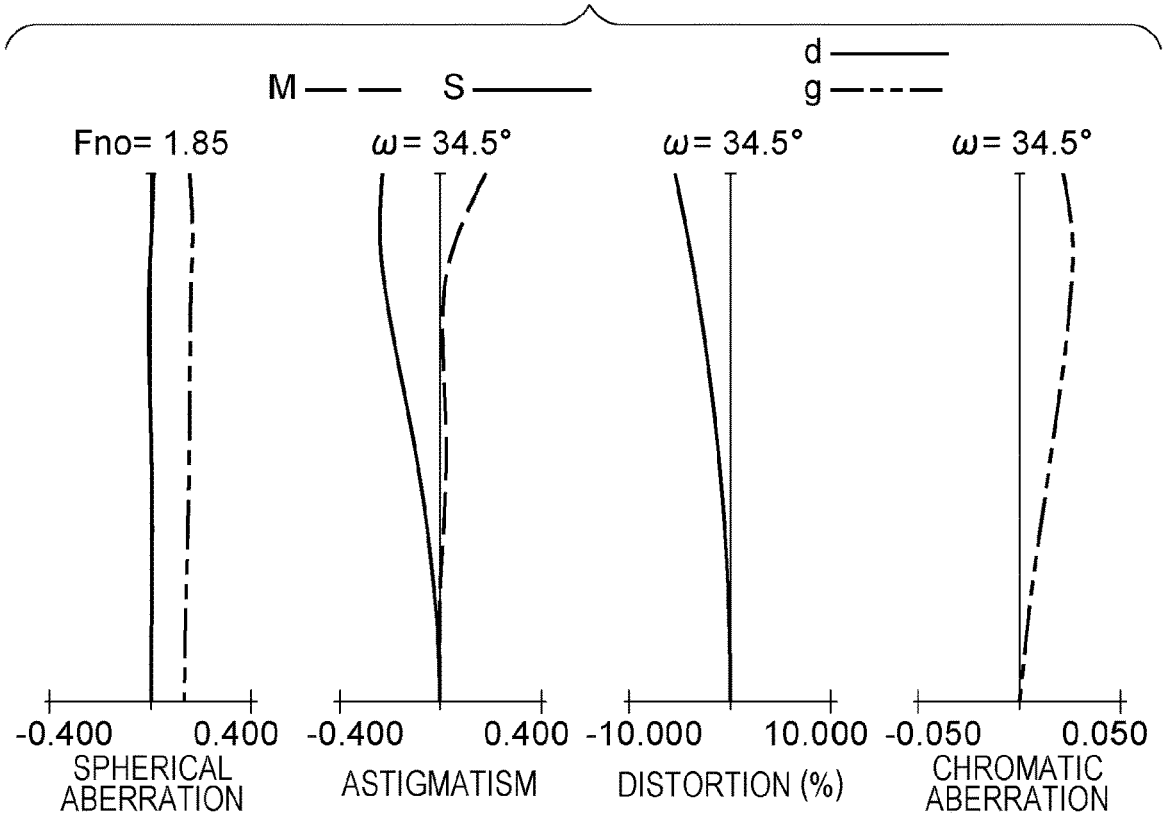
Figure 13:
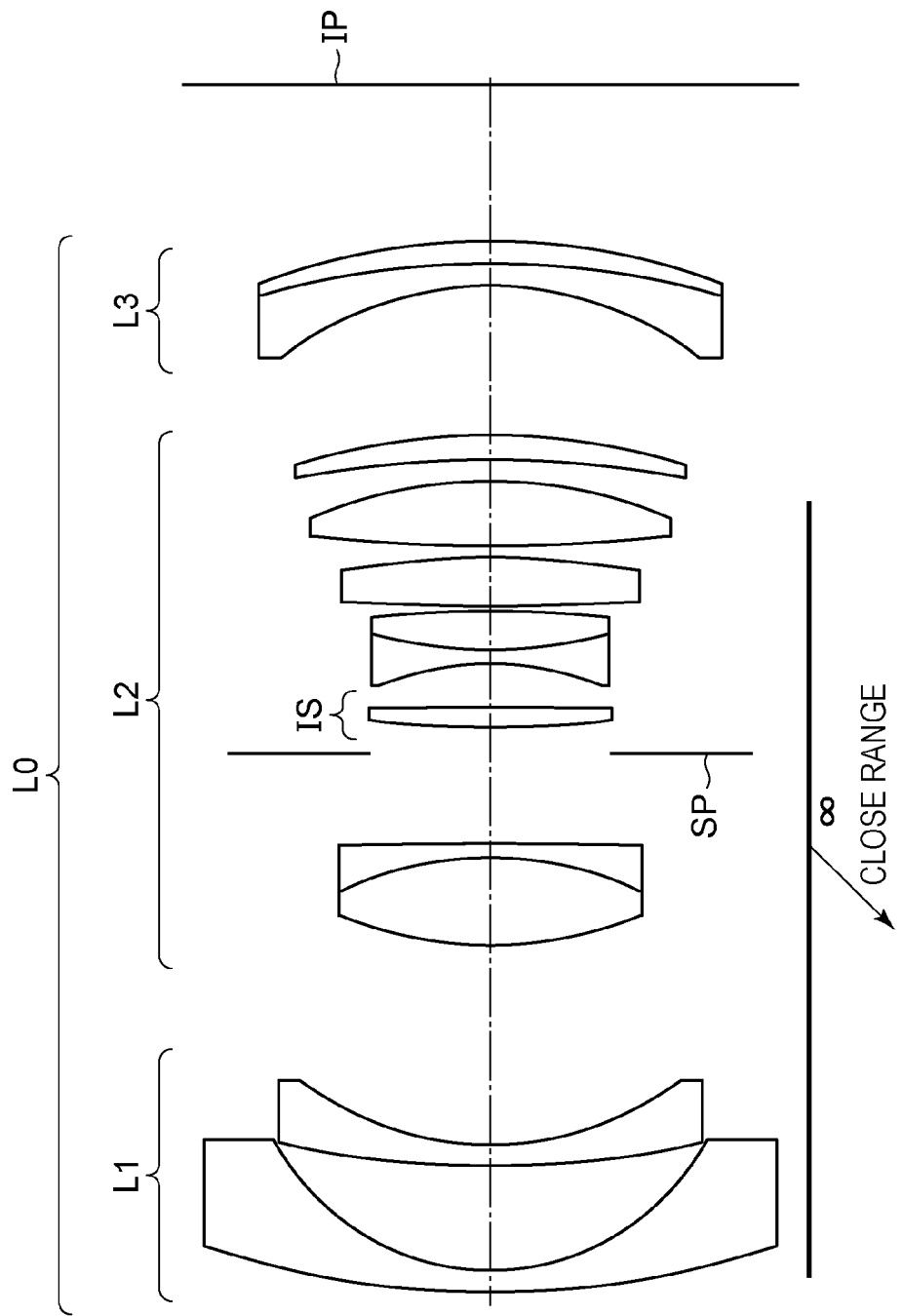
FIG. 13 is a cross-sectional view of an optical system according to a seventh embodiment.
Figure 14A:
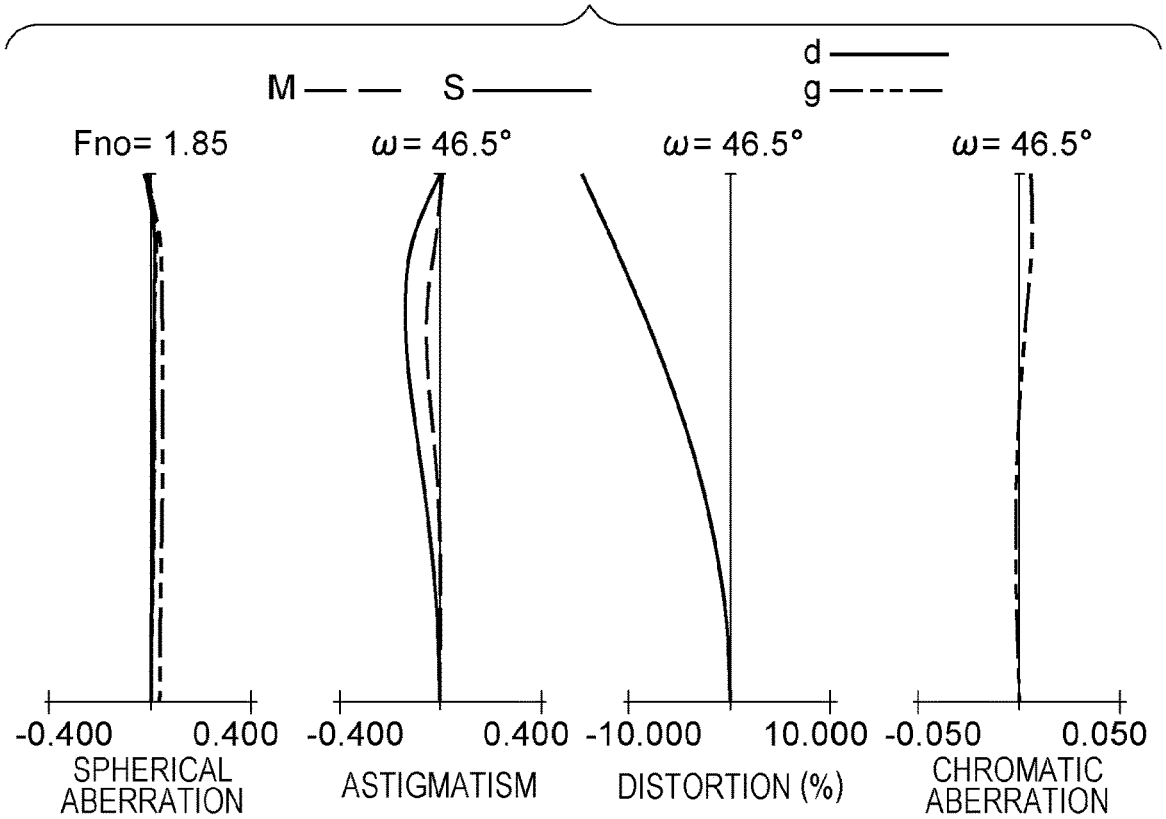
FIGS. 14A and 14B are aberration charts of the optical system of the seventh embodiment.
Figure 14B:
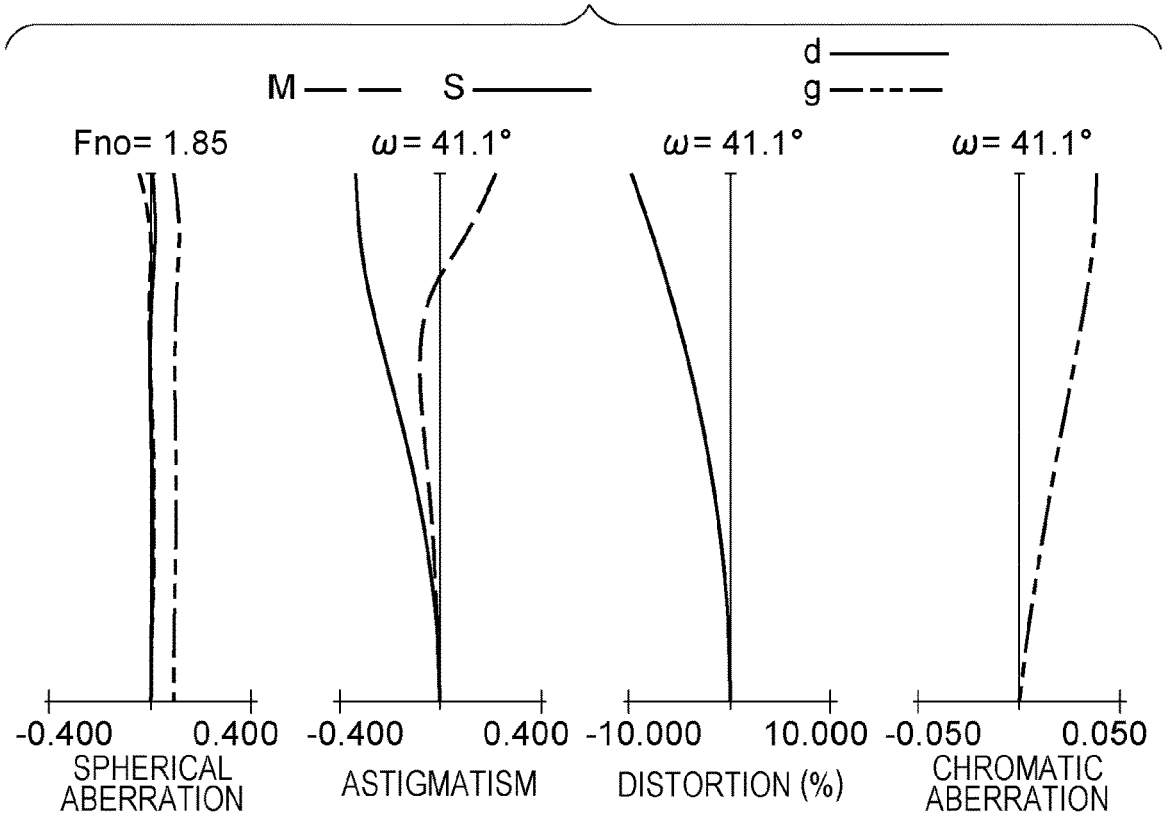

Optical systems, and a lens apparatus and an image capturing apparatus including the same according to embodiments of the present disclosure will be described with reference to the accompanying drawings.

FIGS. 1, 3, 5, 7, 9, 11, and 13 are cross-sectional views of optical systems L0 according to first to seventh embodiments in focusing on an object at infinity. The optical systems L0 of the embodiments can be used for image capturing apparatuses, such as digital video cameras, digital still cameras, broadcasting cameras, silver-halide cameras, and monitoring cameras.

In the lens cross-sectional views, the left side is the object side, and the right side is the image side. The optical systems L0 of the embodiments each include a plurality of lens units. In this specification, each lens unit is the unit of lenses of the optical system L0 separated by a first air space and a second air space in focusing on an object at infinity. The first air space is the widest air space of air spaces formed closer to the object side than a positive lens disposed closest to the object side in the optical system L0. The second air space is an air space between a lens element (a third lens unit L3) disposed closest to the image side of the optical system L0 and a lens disposed nearer to the object side. The lens unit may include only one lens or two or more lenses unless otherwise specified. The lens unit may include an aperture stop SP. While the optical systems LO of the embodiments can move one or more lenses in focusing, the unit of movement during focusing (the unit of lenses that move or stand still during focusing) in this specification is not always equivalent to the lens unit.

The optical systems L0 of the embodiments each include a first lens unit L1 with negative refractive power, a second lens unit L2 with positive refractive power, and a third lens unit L3 with negative refractive power, which are arranged in order from the object side to the image side. The first lens unit L1 and the second lens unit L2 are separated from each other by the first air space. The second lens unit L2 and the third lens unit L3 are separated from each other by the second air space.

Reference sign IP in each cross-sectional view denotes an image plane. In using the optical system L0 of each embodiment as an imaging optical system of a digital still camera or a digital video camera, an imaging plane of a solid-state image sensor (photoelectric conversion element), such as a charge-coupled device (CCD) sensor or a complementary metal-oxide semiconductor (CMOS) sensor, is disposed at the image plane IP. In using the optical system L0 of each embodiment as an imaging optical system for a silver-halide camera, a photosensitive surface corresponding to a film surface is disposed at the image plane IP.

In each cross-sectional view, the moving direction of the lenses in focusing from infinity to a short distance is indicated by the arrow. In the optical system L0 of each embodiment, at least part of the first lens unit and the second lens unit move to the object side in focusing from infinity to the short distance. In other words, the optical system L0 of each embodiment is a front-focusing optical system. The present disclosure may employ any focus type. However, employing the front focus type allows the optical system L0 to be minimized while providing high optical performance in a wide object range from infinity to a close range.

In each cross-sectional view, reference sign IS denotes a correcting lens system, which is a lens system capable of correcting image blur due to hand shake by moving in the direction perpendicular to the optical axis.

FIGS. 2A, 2B, 4A, 4B, 6A, 6B, 8A, 8B, 10A, 10B, 12A, 12B, 14A, and 14B are aberration charts of the optical systems L0 of the first to seventh embodiments, respectively. In the aberration charts, A is an aberration chart in focusing on an object at infinity, and B is an aberration chart in focusing on a close range.

In the aberration charts, reference sign Fno denotes F-number, and ω denotes an image-capturing half angle of view (°). In the spherical aberration charts, the solid line indicates the amount of spherical aberration for d-line (wavelength: 587.6 nm), and the two-dot chain line denotes the amount of spherical aberration for g-line (wavelength: 435.8 nm). In the astigmatism charts, reference sign S denotes a sagittal image plane, and M denotes a meridional image plane. The distortion aberration charts show the amount of distortion aberration for d-line.

The chromatic aberration charts show the amount of magnification chromatic aberration on the g-line.

Next, the characteristics of the optical systems L0 of the embodiments will be described.

In the optical system L0 of each embodiment, the first lens unit L1 consists of one or more negative lenses. In other words, the first lens unit L1 does not include a positive lens. The lens surface of the first lens unit L1 closest to the image side is concave. This configuration of the first lens unit L1 allows the optical system L0 to be wide-angled. Constituting the first lens unit L1 with only one or more negative lenses allows the position of the entrance pupil of the optical system L0 to be located close to the object side, thereby decreasing the diameter of the front lens (the diameter of a lens of the optical system L0 disposed closest to the object side).

The optical system L0 of each embodiment corrects the spherical aberration, the axial chromatic aberration, and so on of the optical system L0 satisfactorily using the second lens unit L2 with positive refractive power through which marginal light passes at a high position.

In the optical system L0 of each embodiment, the third lens unit L3 consists of lens elements having negative refractive power. In this specification, the lens element refers to one lens (single lens) or a cemented lens in which two or more lenses are cemented. In the optical system L0 of each embodiment, the lens surface of the third lens unit L3 closest to the object side is concave. This can bring the optical system close to a so-called symmetrical shape, allowing satisfactory correction of off-axis aberration, such as field curvature.

The optical system L0 of each embodiment satisfies Inequalities (1) to (3).

$$0.08 < x1/TTL < 0.35 \quad (1)$$

$$0.08 < x2/TTL < 0.25 \quad (2)$$

$$0.10 < fL1/fL3 < 0.50 \quad (3)$$

where x1 is the on-axis length of the first air space (the air space between the first lens unit L1 and the second lens unit L2) in focusing on an object at infinity, x2 is the on-axis length of the second air space (the air space between the second lens unit L2 and the third lens unit L3) in focusing on an object at infinity, TTL is the overall optical length of the optical system L0 in focusing on an object at infinity, fL1 is the focal length of the first lens unit L1 in focusing on an object at infinity, and fL3 is the focal length of the third lens unit L3 in focusing on an object at infinity.

Inequality (1) relates to a condition for reducing or eliminating undesirable light (ghosts) caused by reflected light from the first lens unit L1 in a range in which spherical aberration and the like can be sufficiently prevented. If the value of x1/TTL exceeds the upper limit of Inequality (1), it becomes difficult to provide a space for disposing a sufficient number of lenses in the second lens unit L2, making it difficult to correct spherical aberration and so on. If the value of x1/TTL falls below the lower limit of Inequality (1), it becomes difficult to sufficiently reduce or eliminate undesirable light (ghosts) caused by reflected light from the first lens unit L1 (in particular, the lens of the first lens unit L1 closest to the object side). The effect obtained from Inequality (1) is particularly prominent when the optical system L0 is an optical system with a wide angle of view and a high aperture ratio.

Inequality (2) relates to a condition for reducing or eliminating undesirable light (ghosts) caused by reflected light from a rear lens (a lens of the optical system L0 disposed closest to the image side) in a range in which spherical aberration and so on can be prevented.

If the value of x2/TTL exceeds the upper limit of Inequality (2), it becomes difficult to provide a space for disposing a sufficient number of lenses in the second lens unit L2, making it difficult to correct spherical aberration and so on. If the value of x2/TTL falls below the lower limit of Inequality (2), it becomes difficult to sufficiently reduce or eliminate undesirable light (ghosts) caused by reflected light from the rear lens.

Inequality (3) relates to a condition for reducing or eliminating off-axis aberration and preventing the telecentric property of the optical system L0 from deteriorating. If the value of fL1/fL3 exceeds the upper limit of Inequality (3), the power (refractive power) of the third lens unit L3 becomes too large, excessively increasing the incident angle of off-axis rays to the imaging plane. If the value of fL1/fL3 falls below the lower limit of Inequality (3), the power of the third lens unit L3 becomes too small, making it difficult to correct off-axis aberration sufficiently.

At least one of the upper limits and the lower limits of Inequalities (1) to (3) may be specified by Inequalities (1a) to (3a).

$$0.11 < x1/TTL < 0.30 \quad (1a)$$

$$0.10 < x2/TTL < 0.20 \quad (2a)$$

$$0.17 < fL1/fL3 < 0.48 \quad (3a)$$

At least one of the upper limits and the lower limits of Inequalities (1) to (3) may be specified by Inequalities (1b) to (3b).

$$0.12 < x1/TTL < 0.28 \quad (1b)$$

$$0.11 < x2/TTL < 0.15 \quad (2b)$$

$$0.23 < fL1/fL3 < 0.44 \quad (3b)$$

The above configuration allows providing an optical system with high optical performance that is less affected by undesirable light.

Next, conditions that are preferably satisfied by the optical system L0 of each embodiment will be described. It is preferable that the optical system L0 of each embodiment satisfy one or more of the following inequalities.

$$0.07 < (Ndp - Ndn) < 0.25 \quad (4)$$

$$25 < (vdp - vdn) < 70 \quad (5)$$

$$0.63 < \phi r/\phi max \leq 1.00 \quad (6)$$

$$0.70 < \phi f/\phi r < 1.30 \quad (7)$$

$$1.40 < Nave < 1.65 \quad (8)$$

$$0.06 < BF/TTL < 0.35 \quad (9)$$

$$-2.0 < fL1/f < -0.1 \quad (10)$$

$$0.20 < V < 0.60 \quad (11)$$

$$-20[\%] < dist(\omega) < -5[\%] \quad (12)$$

Inequality (4) relates to the refractive index of a first cemented lens of the second lens unit L2 disposed on the object side of the aperture stop SP. The first cemented lens is a cemented lens in which a plurality of lenses including a positive lens and a negative lens is cemented. Sign Ndp denotes the highest refractive index of positive lenses included in the first cemented lens. If the number of positive lenses included in the first cemented lens is only one, the refractive index of the positive lens is Ndp. Sign Ndn denotes the lowest refractive index of negative lenses included in the first cemented lens. If the number of negative lenses included in the first cemented lens is only one, the refractive index of the negative lens is Ndn. If the value of (Ndp−Ndn) exceeds the upper limit of Inequality (4), it becomes difficult to sufficiently achromatize the first cemented lens made of a common glass member. If the value of (Ndp−Ndn) falls below the lower limit of Inequality (4), it becomes difficult to sufficiently decrease the Petzval sum.

Inequality (5) relates to the Abbe number of a second cemented lens of the second lens unit L2 disposed on the image side of the aperture stop SP, where vdp is the largest Abbe number of positive lenses included in the second cemented lens. If the number of positive lenses included in the first cemented lens is only one, the Abbe number of the positive lens is vdp. Sign vdn denotes the smallest Abbe number of negative lenses included in the second cemented lens. If the number of negative lenses included in the second cemented lens is only one, the Abbe number of the negative lens is vdn. If the value of (vdp−vdn) exceeds the upper limit of Inequality (5), the Petzval sum increases in using a common glass member, which makes it difficult to prevent field curvature. If the value of (vdp−vdn) exceeds the lower limit of Inequality (5), the secondary spectrum of chromatic aberration tends not to be sufficiently corrected.

Inequality (6) relates to the diameter of the lens of the optical system L0 disposed closest to the image side, where $\phi r$ is the maximum effective diameter of the lens of the optical system L0 disposed closest to the image side, and $\phi max$ is the largest diameter of the maximum effective diameters of the lenses included in the optical system L0. If the value of $\phi r/\phi max$ falls below the lower limit of Inequality (6), the diameter of the front lens of the optical system L0 becomes too large, resulting in an increase in the size of the optical system L0.

Inequality (7) relates to the diameter of the lens of the optical system L0 disposed closest to the object side, where $\phi f$ is the maximum effective diameter of the lens of the optical system L0 disposed closest to the object side. If the value of $\phi f/\phi r$ exceeds the upper limit of Inequality (7) or falls below the lower limit of Inequality (7), the symmetric shape (symmetry) of the lens shape (lens configuration) of the optical system L0 is corrupted, and as a result, off-axis aberrations, such as coma aberration and field curvature, cannot be corrected satisfactorily.

Inequality (8) relates to the average refractive index of the lenses constituting the first lens unit L1, where Nave is the average value of the refractive indices of the lenses included in the first lens unit L1. If the number of lenses included in the first lens unit L1 is only one, the refractive index of the lens is Nave. If the value of Nave exceeds the upper limit of Inequality (8), the Petzval sum of the optical system L0 is prone to increase, which makes it difficult to sufficiently correct the field curvature. If the value of Nave falls below the lower limit of Inequality (8), the curvature of the lens to be given in providing appropriate power to the first lens unit L1 becomes too large, making it difficult to correct the spherical aberration satisfactorily.

Inequality (9) specifies the relationship between the back focus and the overall length of the optical system L0, where BF is the back focus of the optical system L0. If the value of BF/TTL exceeds the upper limit of Inequality (9), the back focus BF becomes too large, resulting in an increase in the overall length of the optical system L0. If the value of BF/TTL falls below the lower limit of Inequality (9), the interval between the optical system L0 and the imaging plane on which an image sensor or the like is disposed becomes too small. For example, a space for disposing a color filter or the like in front of the imaging plane becomes insufficient.

Inequality (10) relates to the focal length of the first lens unit L1, where fL1 is the focal length of the first lens unit L1 in focusing on an object at infinity, and f is the focal length of the entire system of the optical system L0 in focusing on an object at infinity. If the value of fL1/f exceeds the upper limit of Inequality (10), the negative refractive power of the first lens unit L1 becomes too large, making it difficult to correct the spherical aberration satisfactorily. If the value of fL1/f falls below the lower limit of Inequality (10), the negative refractive power of the first lens unit L1 becomes too small, which increases the optical path length necessary for increasing the size of the bundle of incident light, resulting in an increase in the size of the optical system L0.

Inequality (11) relates to the distortion aberration coefficient V of the optical system L0, where the distortion aberration coefficient V is expressed as a general expression described in the third-order aberration theory:

$$V = \Sigma V_v \ (v \text{ is a natural number})$$

where the subscripted v describes the surface numbers of all of the lenses of the optical system L0 of each embodiment, and $V_v$ is the distortion aberration coefficient of the v-th lens surface from the object side, which is obtained by paraxial ray tracking. The distortion aberration coefficient $V_v$ of each lens surface is expressed as:

$$V_v = \bar{h}_v(\bar{h}_v \bar{Q}_v)^2 \{h_v \Delta_v(1/Ns)\} + (\bar{h}_v \bar{Q}_v)\{\bar{h}_v \Delta_v(1/Nt)\}$$

The numerical expressions constituting the above formula have the following relationship:

$$\bar{h}_v = \bar{h}_v N_v / r_v - \bar{\alpha}_v$$

$$h_v \Delta_v (1/Ns) = \alpha_v'/N_v'^2 - \alpha_v/N_v^2$$

$$\bar{h}_v \Delta_v (1/Nt) = \bar{\alpha}_v'/N_v'^2 - \bar{\alpha}_v/N_v^2$$

The nine variables used in the above formula
$(h_v, \bar{h}_v, a_v, \bar{\alpha}_v, a_v', \bar{\alpha}_v', r_v, N_v, N_v')$ These variables indicate, respectively, the height and the inclination of light passing through the v-th lens surface, and the curvature radius and the refractive index of the lens surface in paraxial ray tracking. Sign $h_v$ denotes the height of light exiting from an on-axial object point with respect to the optical axis at the point of intersection when the light passes through the v-th lens surface.

$\bar{h}_v$

This variable is the height of light exiting from an off-axis object point with respect to the optical axis at the point of intersection when the light passes through the v-th lens surface. Signe $\alpha_v$ denotes the reduced inclination of light exiting from an on-axial object point with respect to the optical axis when the light is incident on the v-th lens surface.

$\bar{\alpha}_v$

This variable is the reduced inclination of light exiting from an off-axis object point with respect to the optical axis when the light is incident on the v-th lens surface. The reduced inclination $\alpha_v'$ is the reduced inclination of light emerging from an on-axial object point with respect to the optical axis when the light exits from the v-th lens surface.

$\bar{\alpha}_v'$

This variable is the reduced inclination of light exiting from an off-axis object point with respect to the optical axis when the light exits from the v-th lens surface. Sign $r_v$ denotes the curvature radius of the v-th lens surface, $N_v$ denotes the refractive index of a space on the object side of the v-th lens surface, and $N_v'$ denotes the refractive index of a space on the image side of the v-th lens surface.

The distortion aberration coefficient V in the present disclosure is a value in focusing on an object at infinity in air. For this reason, initial conditions for light tracking in obtaining the distortion aberration coefficient V are $h_1 = 1$ and $\alpha_1 = 0$, where $h_1$ and $\alpha_1$ are of light rays exiting from an on-axial object point and incident on the first lens surface. The height $\bar{h}_1$ and reduced inclination $\bar{\alpha}_1$ of light exiting from an off-axis object point and incident on the first lens surface are expressed as:

$$\bar{h}_1 = -1$$

where t is the distance from the first lens surface on the optical axis to the position of the entrance pupil of the optical system L0, $$\bar{\alpha}_1 = -1$$

The refractive index N of air is expressed as N=1. The power $\phi_v$ of the v-th lens surface is expressed as $\phi_v = (N_v' - N_v)/r_v$, and the reduced interval $e_v'$ from the v-th lens surface to the (v+1)th lens surface is expressed as $e_v' = d_v'/N_v'$, where $d_v'$ is the surface interval from the v-th lens surface to the (v+1)th lens surface on the optical axis.

Light tracking from an on-axial object point is performed using the following three expressions:

$$\alpha_v' = \alpha_v + h_v \phi_v$$

$$h_{v+1} = h_v - e_v' \alpha_v'$$

$$\alpha_{v+1} = \alpha_v'$$

Light tracking from an off-axis object point is performed using the following three expressions:

$$\bar{\alpha}_v' = \bar{\alpha}_v + \bar{h}_v \phi_v$$

$$\bar{h}_{v+1} = \bar{h}_v - e_v' \bar{\alpha}_v'$$

$$\bar{\alpha}_{v+1} = \bar{\alpha}_v'$$

If the distortion aberration coefficient V increases beyond the upper limit of the Inequality (11), various aberrations of the optical system L0, such as a field curvature, cannot be corrected satisfactorily. If the distortion aberration coefficient V decreases below the lower limit of Inequality (11), the negative refractive power of the first lens unit L1 cannot be efficiently increased, resulting in an increase in the size of the front lens.

Inequality (12) relates to the amount of distortion aberration of the optical system L0. The distortion aberration amount dist(ω) is the amount of distortion of the optical system L0. The distortion aberration amount dist(ω) is an amount defined as (y'−y0)/y0×100[%] using an ideal image height y0 and an actual image height y' in the projection method of y=f×tan ω. The ideal image height y0 is given by the specifications of the optical system L0 (focal length f and the maximum image-capturing half angle of view ω). The actual image height y' is given by the height of principal light from the optical axis at the image plane IP, the light exiting from infinity into the optical system L0 at the maximum image-capturing half angle of view ω. The maximum image-capturing half-angle of view ω can be defined as the maximum diameter of an image circle formed by the optical system L0.

If the distortion aberration amount dist(ω) increases beyond the upper limit of Inequality (12), it becomes difficult to correct various aberrations, such as a field curvature, satisfactorily with the optical system L0. If the distortion aberration amount dist(ω) decreases below the lower limit of Inequality (12), the negative refractive power of the first lens unit L1 cannot be increased sufficiently, resulting in an increase in the size of the front lens.

More preferably, at least one of the upper limits and the lower limits of Inequalities (5) to (12) is a value specified by Inequalities (5a) to (12a).

$$0.08 < Ndp - Ndn < 0.22 \quad (4a)$$

$$30 < vdp - vdn < 65 \quad (5a)$$

$$0.73 < \phi r/\phi max \leq 1.00 \quad (6a)$$

$$0.85 < \phi f/\phi r < 1.29 \quad (7a)$$

$$1.42 < Nave < 1.60 \quad (8a)$$

$$0.08 < BF/TTL < 0.25 \quad (9a)$$

$$-1.8 < fL1/f < -0.5 \quad (10a)$$

$$0.23 < V < 0.55 \quad (11a)$$

$$-18.0[\%] < dist(\omega) < -5.5[\%] \quad (12a)$$

More preferably, at least one of the upper limits and the lower limits of Inequalities (5) to (12) is a value specified by Inequalities (5b) to (12b).

$$0.09 < (Ndp - Ndn) < 0.20 \quad (4b)$$

$$32 < (vdp - vdn) < 60 \quad (5b)$$

$$0.78 < \phi r/\phi max \leq 1.00 \quad (6b)$$

$$0.90 < \phi f/\phi r < 1.28 \quad (7b)$$

$$1.45 < Nave < 1.55 \quad (8b)$$

$$0.09 < BF/TTL < 0.20 \quad (9b)$$

$$-1.5 < fL1/f < -0.8 \quad (10b)$$

$$0.26 < V < 0.50 \quad (12b)$$

$$-16[\%] < dist(\omega) < -6[\%] \quad (13b)$$

Next, a configuration that may be satisfied in the optical system L0 of each embodiment will be described.

The first air space and the second air space may be one of the widest air space and the second widest air space of the air spaces between the lenses in the optical system L0. In other words, the first lens unit L1 and the second lens unit L2, and the second lens unit L2 and the third lens unit L3 may be individually separated by a wide air space in the optical system L0. This allows undesirable light due to the first lens unit L1 and the third lens unit L3 to be further reduced.

An air lens formed by the first air space may have a meniscus shape. An air lens formed by the second air space may have a meniscus shape. This allows undesirable light due to the first lens unit L1 and the third lens unit L3 to be reduced while preventing off-axis aberration, which tends to occur as the optical system L0 increases in the angle of view.

The first lens unit L1 may consist of two or less lenses as in the optical system L0 of each embodiment. This is because, if the number of lenses constituting the first lens unit L1 is three or more, undesirable light due to light reflected in the first lens unit L1 tends to reach the imaging plane. The first lens unit L1 may consist of one lens as are the optical systems L0 of the first, third, and fifth embodiments. This further decreases the influence of undesirable light due to the first lens unit L1.

The lens that is disposed closest to the object side in the first lens unit L1 may be a negative meniscus lens concave to the image plane IP. This allows satisfactorily reducing or eliminating the off-axis aberration of the optical system L0.

The number of lenses of the second lens unit L2 in the optical system L0 of each embodiment is preferably eight or more. If the number of lenses in the second lens unit L2 is seven or less, it becomes difficult to correct the various aberrations of the optical system L0 sufficiently and satisfactorily.

The aperture stop SP may be disposed in the second lens unit L2. This facilitates symmetric configuration of the optical system L0.

The second lens unit L2 may include a first cemented lens on the object side of the aperture stop SP and a second cemented lens on the image side of the aperture stop SP. These cemented lenses may be concentrated in the vicinity of the aperture stop SP at which marginal light is high. This allows satisfactory correction of various aberrations, such as spherical aberration and axial chromatic aberration, which increase when the aperture ratio of the optical system L0 is increased.

The second lens unit L2 may include at least one aspherical lens, on the image side of the aperture stop SP, having a surface shaped so as to increase negative refractive power from the center toward the periphery. This allows satisfactorily correcting the field curvature.

The optical system L0 may include a correcting lens system IS next to the aperture stop SP, as in the first to fourth, sixth, and seventh embodiments. If the correcting lens system IS is disposed in the optical system L0, the correcting lens system IS may be constituted by one lens. The correcting lens system IS may be constituted by two or more lenses in the viewpoint of correcting aberrations, but this increases the weight of the correcting lens system IS. This results in an increase in the size of an actuator for moving the correcting lens system IS, leading to an increase in the size of the optical system L0.

The optical system L0 of each embodiment is designed to allow for residual distortion aberration. This design provides sufficient optical performance even without an aspherical lens in the first lens unit L1 on which incident height of off-axis light rays is high. Accordingly, the first lens unit L1 may be composed entirely of spherical lenses as is the optical system L0 of each embodiment. This allows preventing deterioration of the optical performance due to production errors.

Furthermore, since the optical system L0 of each embodiment is designed to allow for residual distortion aberration, optical devices including the optical system L0 may include a storage that stores information on the distortion aberration amount of the optical system L0. The information on the distortion aberration amount may be information indicating the distortion aberration amount of the optical system L0 or correction value information for correcting the distortion aberration of the optical system L0 by image processing. Examples of the optical devices including the optical system L0 include the interchangeable lenses (lens apparatuses) of a camera system with interchangeable lenses and an integrated camera, such as a compact digital camera.

Figure 15:
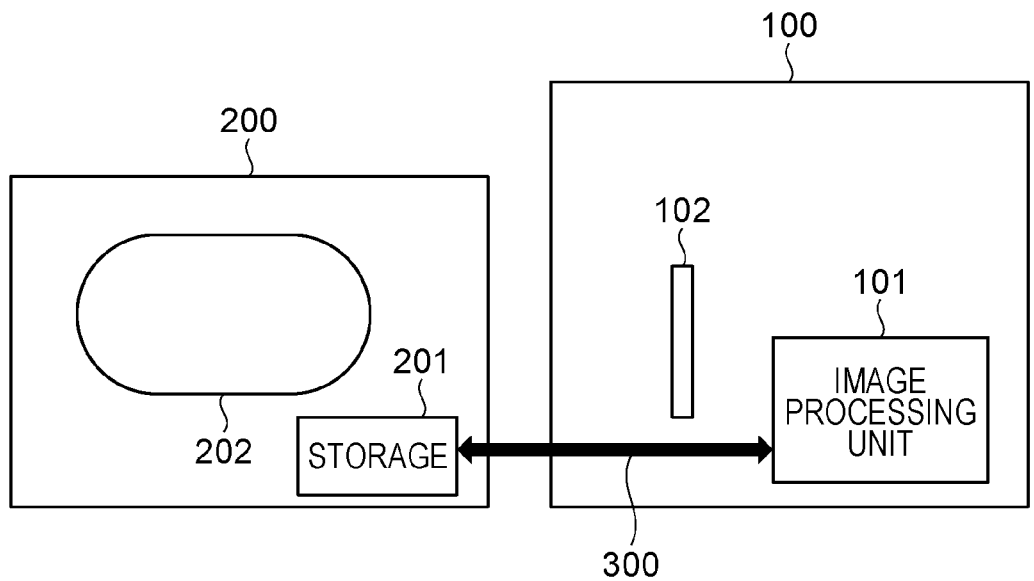
FIG. 15 is a schematic diagram of a camera system with interchangeable lenses.

A case in which the optical system L0 is used for interchangeable lenses of a camera system with interchangeable lenses will be described with reference to FIG. 15. FIG. 15 is a schematic diagram of a camera system with interchangeable lenses including an interchangeable lens 200 and a camera main body 100. A storage 201 of the interchangeable lens 200 stores information on the distortion aberration amount of an optical system 202 equivalent to the optical system L0. The interchangeable lens 200 transmits the information on the distortion aberration amount to the camera main body 100 through a communication path 300 with the camera main body 100 constituted via a mount portion (not shown). An image processing unit 101 of the camera main body 100 can correct image data obtained by capturing an optical image formed by the optical system 202 with an image sensor 102 using the information on the distortion aberration amount obtained from the interchangeable lens 200. Although in FIG. 15 the communication path 300 connects the storage 201 and the image processing unit 101 directly, the storage 201 and the image processing unit 101 do not necessarily have to perform direct communication. For example, the communication between the camera main body 100 and the interchangeable lens 200 may be performed mainly by a communication control unit (for example, a microcomputer, not shown).

Next, Numerical Examples 1 to 7 corresponding to the first to seventh embodiments, respectively, will be shown.

In the surface data of each numerical example, r denotes the curvature radius of each optical surface, d denotes on-axis interval (the distance on the optical axis) between the m-th surface and the (m+1)th surface, where m is the number of a surface counted from the light incident surface, nd denotes the refractive index of each optical member for d-line, and vd denotes the Abbe number of the optical member. The Abbe number vd of some material is expressed as:

$$vd=(Nd-1)/(NF-NC)$$

where Nd, NF, and NC are respective refractive indices of Fraunhofer lines for d-line (wavelength: 587.6 nm), F-line (wavelength: 486.1 nm), C-line (wavelength: 656.3 nm).

In the numerical examples, focal length, F-number, and half angle of view (°) are values when the optical system L0 of each embodiment focuses on an object at infinity. Back focus BF is the distance from the final lens surface to the image plane IP expressed as a length in free space. The overall optical length is a value obtained by adding the back focus BF to the distance from the first lens surface to the final lens surface.

If the optical surface is an aspherical surface, sine * is put to the right of the surface number. The shape of the aspherical surface is expressed as, $$X=(h^2/R)/[1+\{1-(1+k)(h/R)^2\}^{1/2}]+A4 \times h^4+A6 \times h^6+A8 \times h^8+A10 \times h^{10}+A12 \times h^{12}$$

where x is the displacement from the surface apex in the optical axis direction, h is the height from the optical axis in the direction perpendicular to the optical axis, R is the radius of paraxial curvature, k is conic constant, and A4, A6, A8, A10, A12 are the aspherical coefficients of the individual orders, respectively.

Sign "e±XX" in the individual aspherical coefficients indicates "x10±XX".

Numerical Example 1 in mm

Surface Data

| Surface number | r | d | nd | vd | Effective diameter |
|---|---|---|---|---|---|
| 1 | 166.725 | 1.50 | 1.51633 | 64.1 | 31.47 |
| 2 | 17.847 | 13.73 | | | 25.56 |
| 3 | 30.903 | 3.94 | 1.90043 | 37.4 | 22.17 |
| 4 | -170.378 | 3.36 | | | 21.98 |
| 5 | -200.954 | 4.00 | 1.91082 | 35.3 | 20.73 |
| 6 | -21.588 | 1.00 | 1.72825 | 28.5 | 20.50 |
| 7 | 90.491 | 2.02 | | | 19.36 |
| 8 (aperture) | ∞ | 3.27 | | | 18.88 |
| 9 | 70.847 | 1.74 | 1.80400 | 46.5 | 17.66 |
| 10 | -300.114 | 3.64 | | | 17.35 |
| 11 | -18.714 | 1.00 | 1.85478 | 24.8 | 16.23 |
| 12 | 38.885 | 5.54 | 1.49700 | 81.5 | 16.83 |
| 13* | -28.697 | 0.15 | | | 20.57 |
| 14 | 248.946 | 4.85 | 1.95375 | 32.3 | 24.38 |
| 15 | -29.607 | (variable) | | | 25.47 |
| 16 | -66.159 | 2.20 | 1.72916 | 54.7 | 29.66 |
| 17 | -40.851 | 10.00 | | | 30.07 |
| 18 | -23.830 | 1.50 | 1.51742 | 52.4 | 31.01 |
| 19 | -45.530 | 13.20 | | | 33.52 |
| Image plane | ∞ | | | | |

Aspherical Surface Data
13th surface

K = 0.00000e+000 A4 = 1.51499e-005 A6 = -1.89505e-008
A8 = 4.59451e-010 A10 = -1.29807e-012 A12 = -2.87757e-015

Various Data

| Focal length | 28.60 |
|---|---|
| F-number | 1.85 |
| Half angle of view (degree) | 37.1 |
| Image height | 20.15 |
| Overall optical length | 81.00 |
| BF | 13.20 |

| | Infinity | Close range |
|---|---|---|
| d15 | 4.37 | 19.01 |

Lens Unit Data

| Unit | Starting surface | Focal length |
|---|---|---|
| L1 | 1 | -38.84 |
| L2 | 3 | 30.78 |
| L3 | 18 | -98.96 |

Single Lens Data

| Lens | Starting surface | Focal length |
|---|---|---|
| 1 | 1 | -38.84 |
| 2 | 3 | 29.32 |
| 3 | 5 | 26.27 |
| 4 | 6 | -23.84 |
| 5 | 9 | 71.44 |
| 6 | 11 | -14.66 |
| 7 | 12 | 34.15 |
| 8 | 14 | 27.98 |
| 9 | 16 | 141.29 |
| 10 | 18 | -98.96 |

Numerical Example 2 in mm

Surface Data

| Surface number | r | d | nd | vd | Effective diameter |
|---|---|---|---|---|---|
| 1 | 50.658 | 1.57 | 1.48749 | 70.2 | 39.00 |
| 2 | 17.433 | 7.73 | | | 29.64 |
| 3 | 82.620 | 1.50 | 1.48749 | 70.2 | 28.85 | in mm

| | | | | | |
|---|---|---|---|---|---|
| 4 | 22.068 | 13.94 | | | 25.42 |
| 5 | 28.055 | 5.75 | 1.90043 | 37.4 | 19.63 |
| 6 | −26.190 | 1.00 | 1.80000 | 29.8 | 19.37 |
| 7 | −678.364 | 6.06 | | | 18.87 |
| 8 (aperture) | ∞ | 2.86 | | | 16.75 |
| 9 | 74.460 | 1.40 | 1.77250 | 49.6 | 15.62 |
| 10 | −3498.619 | 2.98 | | | 15.34 |
| 11 | −20.479 | 1.00 | 1.85478 | 24.8 | 14.46 |
| 12 | 30.759 | 3.15 | 1.49700 | 81.5 | 14.74 |
| 13 | −76.152 | 0.29 | | | 17.08 |
| 14 | 107.343 | 4.13 | 1.58313 | 59.4 | 19.96 |
| 15* | −42.035 | 0.15 | | | 22.35 |
| 16 | 108.394 | 4.96 | 1.85150 | 40.8 | 25.38 |
| 17 | −35.438 | (variable) | | | 26.28 |
| 18 | −72.427 | 1.84 | 1.83481 | 42.7 | 27.19 |
| 19 | −45.108 | 10.50 | | | 27.56 |
| 20 | −23.819 | 1.57 | 1.51742 | 52.4 | 28.87 |
| 21 | −53.298 | 11.00 | | | 31.31 |
| Image plane | ∞ | | | | |

Aspherical Surface Data
15th surface

K = 0.00000e+000 A4 = 2.14904e−005 A6 = −6.26885e−009
A8 = 3.11936e−010 A10 = −1.96590e−012 A12 = 3.25155e−015

Various Data

| | |
|---|---|
| Focal length | 20.60 |
| F-number | 1.85 |
| Half angle of view (degree) | 46.4 |
| Image height | 18.71 |
| Overall optical length | 84.87 |
| BF | 11.00 |

| | Infinity | Close range |
|---|---|---|
| d17 | 1.50 | 11.92 |

Lens Unit Data

| Unit | Starting surface | focal length |
|---|---|---|
| L1 | 1 | −27.33 |
| L2 | 3 | 28.06 |
| L3 | 20 | −84.77 |

Single Lens Data

| Lens | Starting surface | Focal length |
|---|---|---|
| 1 | 1 | −55.38 |
| 2 | 3 | −62.27 |
| 3 | 5 | 15.84 |
| 4 | 6 | −34.08 |
| 5 | 9 | 94.40 |
| 6 | 11 | −14.25 |
| 7 | 12 | 44.52 |
| 8 | 14 | 52.33 |
| 9 | 16 | 31.87 |
| 10 | 18 | 139.00 |
| 11 | 20 | −84.77 |

Numerical Example 3 in mm

Surface Data

| Surface number | r | d | nd | vd | Effective diameter |
|---|---|---|---|---|---|
| 1 | 352.223 | 1.57 | 1.51633 | 64.1 | 33.00 |
| 2 | 16.734 | 15.32 | | | 25.69 |
| 3 | 32.834 | 3.88 | 1.91082 | 35.3 | 20.54 |
| 4 | −101.361 | 2.45 | | | 20.39 |
| 5 | −173.026 | 3.85 | 1.90043 | 37.4 | 19.43 |
| 6 | −20.106 | 1.00 | 1.72825 | 28.5 | 19.21 |
| 7 | 92.116 | 2.92 | | | 18.19 |
| 8 (aperture) | ∞ | 3.40 | | | 17.43 |
| 9 | 70.143 | 1.65 | 1.67790 | 55.3 | 16.24 |
| 10 | −252.397 | 3.51 | | | 15.95 |
| 11 | −15.958 | 1.00 | 1.85478 | 24.8 | 15.03 |
| 12 | 71.900 | 3.99 | 1.49700 | 81.5 | 19.50 |
| 13 | −28.609 | 0.15 | | | 18.99 |
| 14 | 162.276 | 5.15 | 1.91082 | 35.3 | 22.80 |
| 15 | −27.659 | 0.15 | | | 24.07 |
| 16 | −83.020 | 2.50 | 1.53110 | 55.9 | 24.80 |
| 17* | −48.642 | (variable) | | | 25.55 |
| 18 | −79.703 | 2.09 | 1.72916 | 54.7 | 28.60 |
| 19 | −45.710 | 10.30 | | | 29.00 |
| 20 | −24.031 | 2.55 | 1.51742 | 52.4 | 30.41 |
| 21 | −44.953 | 11.00 | | | 33.46 |
| Image plane | ∞ | | | | |

Aspherical Surface Data
17th surface

K = 0.00000e+000 A4 = 1.70126e−005 A6 = −2.50325e−009
A8 = 1.03885e−010 A10 = −5.41918e−013 A12 = 1.15952e−015

Various Data

| | |
|---|---|
| Focal length | 24.72 |
| F-number | 1.85 |
| Half angle of view (degree) | 41.2 |
| Image height | 19.34 |
| Overall optical length | 81.00 |
| BF | 11.00 |

| | Infinity | Close range |
|---|---|---|
| d17 | 2.56 | 15.56 |

Lens Unit Data

| Unit | Starting surface | focal length |
|---|---|---|
| L1 | 1 | −34.08 |
| L2 | 3 | 29.56 |
| L3 | 20 | −104.12 |

Single Lens Data

| Lens | Starting surface | Focal length |
|---|---|---|
| 1 | 1 | −34.08 |
| 2 | 3 | 27.61 |
| 3 | 5 | 24.97 |
| 4 | 6 | −22.58 |
| 5 | 9 | 81.14 |
| 6 | 11 | −15.20 |
| 7 | 12 | 41.73 |
| 8 | 14 | 26.28 |
| 9 | 16 | 215.73 |
| 10 | 18 | 143.27 |
| 11 | 20 | −104.12 |

Numerical Example 4 in mm

Surface Data

| Surface number | r | d | nd | vd | Effective diameter |
|---|---|---|---|---|---|
| 1 | 67.195 | 1.57 | 1.48749 | 70.2 | 39.00 |
| 2 | 18.918 | 7.01 | | | 30.04 |
| 3 | 105.995 | 1.50 | 1.48749 | 70.2 | 29.39 |
| 4 | 25.853 | (variable) | | | 26.24 |
| 5 | 29.535 | 4.41 | 1.90043 | 37.4 | 18.94 |
| 6 | −40.982 | 1.00 | 1.80000 | 29.8 | 18.75 |
| 7 | −398.457 | 6.44 | | | 18.47 |
| 8 (aperture) | ∞ | 2.93 | | | 16.53 |
| 9 | 96.281 | 1.33 | 1.77250 | 49.6 | 15.57 |
| 10 | −501.436 | 2.99 | | | 15.35 |
| 11 | −19.791 | 1.00 | 1.85478 | 24.8 | 14.60 |
| 12 | 31.208 | 4.04 | 1.49700 | 81.5 | 15.05 |
| 13 | −38.215 | 0.15 | | | 17.83 |
| 14* | 99.997 | 3.68 | 1.58313 | 59.4 | 20.79 |
| 15* | −55.869 | 0.45 | | | 23.06 |
| 16 | 418.363 | 5.30 | 1.85150 | 40.8 | 25.67 |
| 17 | −28.156 | (variable) | | | 26.72 |
| 18 | −110.776 | 1.87 | 1.83481 | 42.7 | 27.94 |
| 19 | −57.108 | 10.50 | | | 28.22 |
| 20 | −23.854 | 1.57 | 1.51742 | 52.4 | 28.97 |
| 21 | −72.046 | 11.52 | | | 31.58 |
| Image plane | ∞ | | | | |

Aspherical Surface Data

14th surface $K = 0.00000e+000\ A4 = -1.52854e-005\ A6 = -2.71853e-008$
$A8 = -4.82286e-010$ 15th surface $K = 0.00000e+000\ A4 = 1.02317e-005\ A6 = -5.45429e-008$
$A8 = -1.79351e-010\ A10 = -8.19774e-013\ A12 = -9.61042e-016$

Various Data

| | |
|---|---|
| Focal length | 20.50 |
| F-number | 1.85 |
| Half angle of view (degree) | 46.5 |
| Image height | 18.60 |
| Overall optical length | 84.95 |
| BF | 11.52 |

| | Infinity | Close range |
|---|---|---|
| d4 | 14.19 | 13.54 |
| d17 | 1.50 | 12.50 |

Lens Unit Data

| Unit | Starting surface | Focal length |
|---|---|---|
| L1 | 1 | −28.95 |
| L2 | 5 | 28.25 |
| L3 | 20 | −69.70 |

Single Lens Data

| Lens | Starting surface | Focal length |
|---|---|---|
| 1 | 1 | −54.59 |
| 2 | 3 | −70.57 |
| 3 | 5 | 19.64 |
| 4 | 6 | −57.17 |
| 5 | 9 | 104.66 |
| 6 | 11 | −14.04 |
| 7 | 12 | 35.25 |
| 8 | 14 | 62.01 |
| 9 | 16 | 31.15 |
| 10 | 18 | 139.00 |
| 11 | 20 | −69.70 |

Numerical Example 5 in mm

Surface Data

| Surface number | r | d | nd | vd | Effective diameter |
|---|---|---|---|---|---|
| 1 | 264.891 | 1.57 | 1.51742 | 52.4 | 32.60 |
| 2 | 15.736 | 14.57 | | | 25.06 |
| 3 | 29.703 | 3.45 | 1.90366 | 31.3 | 20.67 |
| 4 | −1467.268 | 0.16 | | | 20.50 |
| 5 | 51.003 | 5.35 | 1.80400 | 46.5 | 20.23 |
| 6 | −22.603 | 1.05 | 1.64769 | 33.8 | 19.59 |
| 7 | 43.603 | 4.03 | | | 17.74 |
| 8 (aperture) | ∞ | 2.26 | | | 16.32 |
| 9 | −281.459 | 1.68 | 1.72916 | 54.7 | 15.33 |
| 10 | −41.378 | 1.14 | | | 15.08 |
| 11 | −17.748 | 1.00 | 1.85478 | 24.8 | 14.94 |
| 12 | 27.023 | 3.30 | 1.49700 | 81.5 | 15.26 |
| 13 | −78.691 | 0.15 | | | 15.71 |
| 14 | 63.292 | 4.74 | 1.91082 | 35.3 | 18.21 |
| 15 | −25.839 | 0.15 | | | 19.59 |
| 16 | −44.636 | 2.10 | 1.53110 | 55.9 | 20.04 |
| 17* | −44.385 | (variable) | | | 21.14 |
| 18 | −91.245 | 1.94 | 1.67790 | 55.3 | 25.80 |
| 19 | −46.955 | 10.30 | | | 26.25 |
| 20 | −23.866 | 1.57 | 1.51742 | 52.4 | 28.94 |
| 21 | −45.889 | 10.50 | | | 31.60 |
| Image plane | ∞ | | | | |

Aspherical Surface Data
17th surface $K = 0.00000e+000\ A4 = 2.83931e-005\ A6 = -5.17075e-008$
$A8 = 1.49551e-009\ A10 = -1.23012e-011\ A12 = 3.69169e-014$

Various Data

| | |
|---|---|
| focal length | 24.60 |
| F-number | 1.85 |
| Half angle of view (degree) | 41.3 |
| Image height | 19.32 |
| Overall optical length | 73.00 |
| BF | 10.50 |

| | Infinity | Close range |
|---|---|---|
| d17 | 2.00 | 14.96 |

Lens Unit Data

| Unit | Starting surface | Focal length |
|---|---|---|
| L1 | 1 | −32.40 |
| L2 | 3 | 25.73 |
| L3 | 20 | −98.50 |

Single Lens Data

| Lens | Starting surface | focal length |
|---|---|---|
| 1 | 1 | −32.40 |
| 2 | 3 | 32.25 |
| 3 | 5 | 20.13 |
| 4 | 6 | −22.84 |
| 5 | 9 | 66.33 |
| 6 | 11 | −12.40 |
| 7 | 12 | 40.90 |
| 8 | 14 | 20.67 |

-continued

| in mm | | |
|---|---|---|
| 9 | 16 | 3810.00 |
| 10 | 18 | 140.21 |
| 11 | 20 | −98.50 |

Numerical Example 6

| in mm | | | | | |
|---|---|---|---|---|---|
| Surface Data | | | | | |
| Surface number | r | d | nd | vd | Effective diameter |
| 1 | 83.021 | 1.50 | 1.51633 | 64.1 | 33.00 |
| 2 | 18.741 | 3.88 | | | 26.63 |
| 3 | 43.536 | 1.50 | 1.48749 | 70.2 | 26.33 |
| 4 | 22.900 | 10.50 | | | 24.12 |
| 5 | 26.464 | 5.00 | 1.90043 | 37.4 | 20.26 |
| 6 | −129.459 | 2.04 | | | 19.88 |
| 7 | −120.297 | 4.88 | 1.83481 | 42.7 | 19.02 |
| 8 | −23.035 | 1.01 | 1.72825 | 28.5 | 18.51 |
| 9 | 201.055 | 1.70 | | | 17.82 |
| 10 (aperture) | ∞ | 4.54 | | | 17.34 |
| 11 | 59.005 | 1.51 | 1.80400 | 46.5 | 15.74 |
| 12 | 1194.251 | 3.16 | | | 15.44 |
| 13 | −19.019 | 1.05 | 1.85478 | 24.8 | 14.53 |
| 14 | 38.000 | 6.43 | 1.58313 | 59.4 | 21.00 |
| 15* | −27.217 | 0.15 | | | 21.84 |
| 16 | 80.132 | 5.24 | 1.91082 | 35.3 | 27.50 |
| 17 | −43.861 | (variable) | | | 28.33 |
| 18 | −117.059 | 2.41 | 1.77250 | 49.6 | 29.26 |
| 19 | −49.631 | 10.50 | | | 29.57 |
| 20 | −23.346 | 1.50 | 1.51742 | 52.4 | 29.83 |
| 21 | −53.345 | (variable) | | | 32.24 |
| Image plane | ∞ | | | | |

Aspherical Surface Data
15th surface

K = 0.00000e+000 A4 = 1.37287e−005 A6 = 7.17992e−009
A8 = 3.79205e−010 A10 = −1.27723e−012 A12 = −3.75238e−016

| Various Data | |
|---|---|
| Focal length | 24.72 |
| F-number | 1.85 |
| Half angle of view (degree) | 41.2 |
| Image height | 19.54 |
| Overall optical length | 81.00 |
| BF | 11.01 |

| | Infinity | Close range |
|---|---|---|
| d17 | 1.50 | 14.93 |
| d21 | 11.01 | 15.41 |

| Lens Unit Data | | |
|---|---|---|
| Unit | Starting surface | Focal length |
| L1 | 1 | −31.04 |
| L2 | 5 | 29.34 |
| L3 | 20 | −81.63 |

| Single Lens Data | | |
|---|---|---|
| Lens | Starting surface | Focal length |
| 1 | 1 | −47.25 |
| 2 | 3 | −101.52 |
| 3 | 5 | 24.78 |
| 4 | 7 | 33.37 |
| 5 | 8 | −28.32 |

-continued

| in mm | | |
|---|---|---|
| 6 | 11 | 77.16 |
| 7 | 13 | −14.70 |
| 8 | 14 | 28.22 |
| 9 | 16 | 31.76 |
| 10 | 18 | 109.83 |
| 11 | 20 | −81.63 |

Numerical Example 7

| in mm | | | | | |
|---|---|---|---|---|---|
| Surface Data | | | | | |
| Surface number | r | d | nd | vd | Effective diameter |
| 1 | 62.207 | 1.57 | 1.48749 | 70.2 | 39.00 |
| 2 | 17.164 | 7.36 | | | 29.18 |
| 3 | 68.945 | 1.50 | 1.48749 | 70.2 | 28.49 |
| 4 | 21.981 | 14.04 | | | 25.39 |
| 5 | 28.190 | 6.15 | 1.90043 | 37.4 | 20.05 |
| 6 | −24.474 | 1.00 | 1.80000 | 29.8 | 19.78 |
| 7 | −425.753 | 6.35 | | | 19.24 |
| 8 (aperture) | ∞ | 1.85 | | | 16.85 |
| 9 | 81.838 | 1.37 | 1.77250 | 49.6 | 16.02 |
| 10 | −2397.970 | 3.06 | | | 15.74 |
| 11 | −20.494 | 1.00 | 1.85478 | 24.8 | 14.83 |
| 12 | 32.211 | 2.71 | 1.49700 | 81.5 | 15.13 |
| 13 | −77.068 | 0.33 | | | 15.46 |
| 14 | 153.315 | 3.46 | 1.58313 | 59.4 | 17.52 |
| 15* | −44.555 | 0.78 | | | 19.78 |
| 16 | 116.756 | 4.56 | 1.85150 | 40.8 | 23.16 |
| 17 | −32.391 | (variable) | | | 24.11 |
| 18 | −73.624 | 1.74 | 1.83481 | 42.7 | 25.85 |
| 19 | −45.530 | 10.50 | | | 26.23 |
| 20 | −23.824 | 1.57 | 1.57501 | 41.5 | 28.06 |
| 21 | −58.211 | 1.57 | 1.72916 | 54.7 | 30.69 |
| 22 | −45.493 | 11.00 | | | 31.24 |
| Image plane | ∞ | | | | |

Aspherical Surface Data
15th surface

K = 0.00000e+000 A4 = 2.43759e−005 A6 = −2.41897e−008
A8 = 1.11961e−009 A10 = −1.07335e−011 A12 = 3.35241e−014

| Various Data | |
|---|---|
| Focal length | 20.51 |
| F-number | 1.85 |
| Half angle of view (degree) | 46.5 |
| Image height | 18.45 |
| Overall optical length | 84.97 |
| BF | 11.00 |

| | Infinity | Close range |
|---|---|---|
| d17 | 1.50 | 12.16 |

| Lens Unit Data | | |
|---|---|---|
| Unit | Starting surface | Focal length |
| L1 | 1 | −26.42 |
| L2 | 5 | 23.28 |
| L | 20 | −99.57 |

| Single Lens Data | | |
|---|---|---|
| Lens | Starting surface | Focal length |
| 1 | 1 | −49.19 |
| 2 | 3 | −66.89 |

-continued

| in mm | | |
|---|---|---|
| 3 | 5 | 15.40 |
| 4 | 6 | -32.49 |
| 5 | 9 | 102.47 |
| 6 | 11 | -14.53 |
| 7 | 12 | 46.09 |
| 8 | 14 | 59.59 |
| 9 | 16 | 30.20 |
| 10 | 18 | 139.00 |
| 11 | 20 | -71.33 |
| 12 | 21 | 271.44 |

The table below shows various values in the embodiments.

TABLE 1

| | FIRST EMBODIMENT | SECOND EMBODIMENT | THIRD EMBODIMENT | FOURTH EMBODIMENT | FIFTH EMBODIMENT | SIXTH EMBODIMENT | SEVENTH EMBODIMENT |
|---|---|---|---|---|---|---|---|
| f | 28.60 | 20.60 | 24.72 | 20.50 | 24.60 | 24.72 | 20.51 |
| fL1 | -38.84 | -27.34 | -34.07 | -28.94 | -32.40 | -31.04 | -26.42 |
| fL3 | -98.96 | -84.77 | -104.12 | -69.70 | -98.50 | -81.63 | -99.57 |
| x1 | 13.73 | 23.17 | 15.32 | 22.70 | 14.57 | 15.88 | 14.04 |
| x2 | 10.00 | 10.50 | 10.30 | 10.50 | 10.30 | 10.50 | 10.50 |
| BF | 13.20 | 11.00 | 11.00 | 11.52 | 10.50 | 11.01 | 11.00 |
| TTL | 81.00 | 84.87 | 81.00 | 84.95 | 73.00 | 81.00 | 84.97 |
| Ndp | 1.911 | 1.900 | 1.900 | 1.900 | 1.804 | 1.835 | 1.900 |
| Ndn | 1.728 | 1.800 | 1.728 | 1.800 | 1.648 | 1.728 | 1.800 |
| vdp | 81.50 | 81.50 | 81.50 | 81.50 | 81.50 | 59.40 | 81.50 |
| vdn | 24.80 | 24.80 | 24.80 | 24.80 | 24.80 | 24.80 | 24.80 |
| $\phi$max | 34.87 | 39.00 | 33.46 | 39.00 | 32.60 | 33.00 | 39.00 |
| $\phi$f | 34.87 | 39.00 | 33.00 | 39.00 | 32.60 | 33.00 | 39.00 |
| $\phi$r | 33.52 | 31.31 | 33.46 | 31.58 | 31.60 | 32.24 | 31.24 |
| $\omega$ | 37.1 | 46.4 | 41.2 | 46.5 | 41.3 | 41.2 | 46.5 |
| x1/TTL | 0.170 | 0.273 | 0.189 | 0.267 | 0.200 | 0.196 | 0.165 |
| x2/TTL | 0.123 | 0.124 | 0.127 | 0.124 | 0.141 | 0.130 | 0.124 |
| fL1/fL3 | 0.392 | 0.323 | 0.327 | 0.415 | 0.329 | 0.380 | 0.265 |
| Nave | 1.516 | 1.487 | 1.516 | 1.487 | 1.517 | 1.501 | 1.487 |
| Ndp - Ndn | 0.183 | 0.100 | 0.172 | 0.100 | 0.156 | 0.107 | 0.100 |
| vdp - vdn | 56.70 | 56.70 | 56.70 | 56.70 | 56.70 | 34.60 | 56.70 |
| $\phi$r/$\phi$max | 0.961 | 0.803 | 1.000 | 0.810 | 0.969 | 0.977 | 0.801 |
| $\phi$f/$\phi$r | 1.040 | 1.246 | 0.986 | 1.235 | 1.032 | 1.024 | 1.248 |
| BF/TTL | 0.163 | 0.130 | 0.136 | 0.136 | 0.144 | 0.136 | 0.129 |
| fL1/f | -1.358 | -1.327 | -1.378 | -1.412 | -1.317 | -1.256 | -1.288 |
| V | 0.301 | 0.384 | 0.382 | 0.407 | 0.348 | 0.343 | 0.417 |
| dist$\omega$ | -6.773 | -13.553 | -10.593 | -14.015 | -10.681 | -9.544 | -14.724 |

Image Capturing Apparatus

Figure 16:
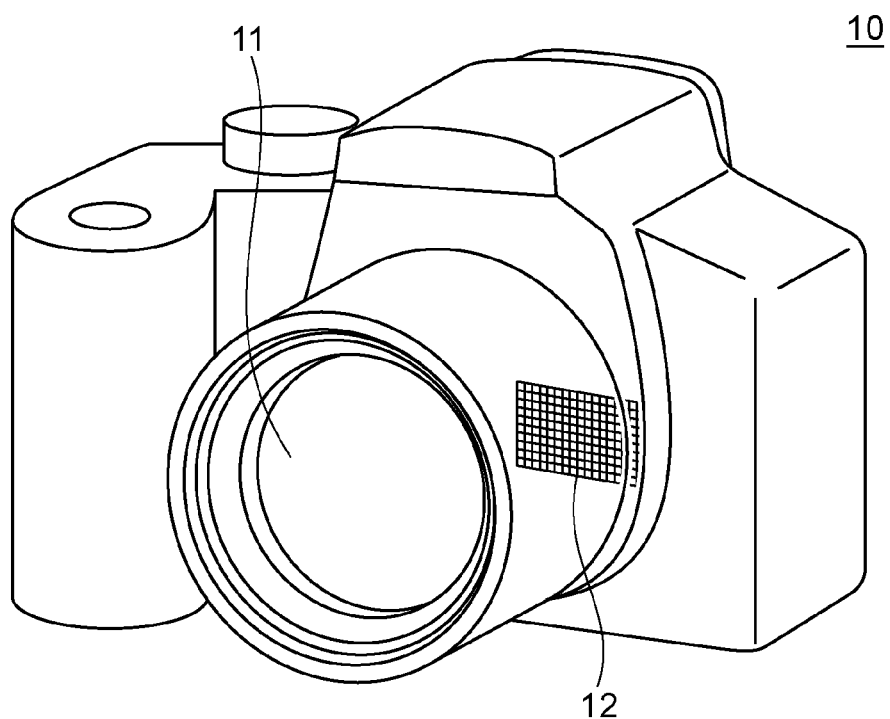
FIG. 16 is a schematic diagram of an image capturing apparatus.

A digital still camera (image capturing apparatus) using the optical system L0 according to an embodiment of the present disclosure as a lens apparatus will be described with reference to FIG. 16. In FIG. 16, reference sign 10 denotes a camera main body, and 11 denotes a lens apparatus including the optical system L0 described in one of the first to seventh embodiments. Reference sign 12 denotes a solid-state image sensor (photoelectric conversion element), such as a CCD sensor or a CMOS sensor, which is housed in the camera main body 10 and receives an optical image formed by the lens apparatus 11 and photoelectrically converts the image. The camera main body 10 may be a what-is-called single-lens reflex camera including a quick turn mirror or a what-is-called mirrorless camera with no quick turn mirror.

Applying the optical system L0 according to an embodiment of the present disclosure to an image capturing apparatus, such as a digital still camera, provides an image capturing apparatus capable of capturing a subject image using an optical system with high optical performance that is less influenced by undesirable light.

The present disclosure provides an optical system with high optical performance that is less influenced by undesirable light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical system comprising, in order from an object side to an image side:
   a first lens unit consisting of one or more negative lenses;
   a second lens unit with positive refractive power disposed so as to have a first air space from the first lens unit; and
   a third lens unit disposed so as to have a second air space from the second lens unit,
   wherein the first air space is a widest air space of air spaces formed closer to the object side than a positive lens disposed closest to the object side in the optical system,
   wherein a surface of the first lens unit closest to the image side is concave,
   wherein the third lens unit consists of a lens element with negative refractive power and having a concave surface on the object side, and
   wherein the following inequalities are satisfied;

$$0.08 < x1/TTL < 0.35$$

$$0.08 < x2/TTL < 0.25$$

$$0.10 < fL1/fL3 < 0.50$$

where x1 is an on-axis length of the first air space in focusing on an object at infinity, x2 is an on-axis length of the second air space in focusing on an object at infinity, TTL is an overall optical length of the optical system in focusing on an object at infinity, fL1 is a focal length of the first lens unit in focusing on an object at infinity, and fL3 is a focal length of the third lens unit in focusing on an object at infinity.

2. The optical system according to claim 1, wherein the second lens unit includes an aperture stop and a first cemented lens disposed on the object side of the aperture stop.

3. The optical system according to claim 2,
wherein the first cemented lens includes a positive lens and a negative lens, and
wherein the following inequality is satisfied;

$$0.07<(Ndp-Ndn)<0.25$$

where Ndp is a highest refractive index of a positive lens included in the first cemented lens, and Ndn is a lowest refractive index of a negative lens included in the first cemented lens.

4. The optical system according to claim 1, wherein the second lens unit includes an aperture stop and a second cemented lens disposed on the image side of the aperture stop.

5. The optical system according to claim 4, wherein the following inequality is satisfied:

$$25<(vdp-vdn)<70$$

where vdp is a largest Abbe number of a positive lens included in the second cemented lens, and vdn is a smallest Abbe number of a negative lens included in the second cemented lens.

6. The optical system according to claim 1, wherein the following inequality is satisfied:

$$0.63<\phi r/\phi max \leq 1.00$$

where $\phi r$ is an effective diameter of a lens disposed closest to the image side of the optical system, and $\phi max$ is a largest diameter of effective diameters of lenses included in the optical system.

7. The optical system according to claim 1, wherein the following inequality is satisfied:

$$0.70<\phi f/\phi r<1.30$$

where $\phi f$ is an effective diameter of a lens disposed closest to the object side of the optical system, and $\phi r$ is an effective diameter of a lens disposed closest to the image side of the optical system.

8. The optical system according to claim 1, wherein the following inequality is satisfied:

$$1.40<Nave<1.65$$

where Nave is an average value of refractive indices of lenses included in the first lens unit.

9. The optical system according to claim 1, wherein the following inequality is satisfied:

$$0.06<BF/TTL<0.35$$

where BF is a back focus of the optical system.

10. The optical system according to claim 1, wherein the following inequality is satisfied:

$$-2.0<fL1/f<-0.1$$

where f is a focal length of the optical system in focusing on an object at infinity.

11. The optical system according to claim 1, wherein the following inequality is satisfied:

$$0.20<V<0.60$$

where V is a third-order distortion aberration coefficient of the optical system in focusing on an object at infinity.

12. The optical system according to claim 1, wherein the following inequality is satisfied:

$$-20[\%]<dist(\omega)<-5[\%]$$

where $dist(\omega)$ is a distortion aberration amount of the optical system at a largest image-capturing half angle of view $\omega$ of the optical system in focusing on an object at infinity.

13. The optical system according to claim 1, wherein the first air space and the second air space are one of a widest air space and a second widest air space of air spaces between the lenses of the optical system.

14. The optical system according to claim 1, wherein the first lens unit consists of two or less lens.

15. The optical system according to claim 1, wherein a negative meniscus lens whose lens surface on the image side is concave is disposed closest to object side of the first lens unit.

16. The optical system according to claim 1, wherein the second lens unit includes eight or more lenses.

17. The optical system according to claim 1, wherein the second lens unit includes an aperture stop and an aspherical lens disposed on the image side of the aperture stop, the aspherical lens having an aspherical surface with a shape that increases in negative refractive power from a center to a periphery.

18. The optical system according to claim 1, wherein at least part of the first lens unit and the second lens unit moves to the object side in focusing from infinity to a short distance.

19. A lens apparatus comprising:
an optical system; and
a storage that stores information on distortion aberration of the optical system,
wherein the optical system includes, in order from an object side to an image side:
  a first lens unit consisting of one or more negative lenses;
  a second lens unit with positive refractive power disposed so as to have a first air space from the first lens unit; and
  a third lens unit disposed so as to have a second air space from the second lens unit,
wherein the first air space is a widest air space of air spaces formed closer to the object side than a positive lens disposed closest to the object side in the optical system,
wherein a surface of the first lens unit closest to the image side is concave,
wherein the third lens unit consists of a lens element with negative refractive power and having a concave surface on the object side, and
wherein the following inequalities are satisfied;

$$0.08<x1/TTL<0.35$$

$$0.08<x2/TTL<0.25$$

$$0.10<fL1/fL3<0.50$$

where x1 is an on-axis length of the first air space in focusing on an object at infinity, x2 is an on-axis length of the second air space in focusing on an object at infinity, TTL is an overall optical length of the optical system in focusing on an object at infinity, fL1 is a focal length of the first lens unit in focusing on an object at infinity, and fL3 is a focal length of the third lens unit in focusing on an object at infinity.

20. An image capturing apparatus comprising:
an optical system; and
an image sensor that receives an image formed by the optical system,
wherein the optical system includes, in order from an object side to an image side:

a first lens unit consisting of one or more negative lenses;
a second lens unit with positive refractive power disposed so as to have a first air space from the first lens unit; and
a third lens unit disposed so as to have a second air space from the second lens unit,
wherein the first air space is a widest air space of air spaces formed closer to the object side than a positive lens disposed closest to the object side in the optical system,
wherein a surface of the first lens unit closest to the image side is concave,
wherein the third lens unit consists of a lens element with negative refractive power and having a concave surface on the object side, and
wherein the following inequalities are satisfied;

$0.08 < x1/TTL < 0.35$ $0.08 < x2/TTL < 0.25$ $0.10 < fL1/fL3 < 0.50$ where x1 is an on-axis length of the first air space in focusing on an object at infinity, x2 is an on-axis length of the second air space in focusing on an object at infinity, TTL is an overall optical length of the optical system in focusing on an object at infinity, fL1 is a focal length of the first lens unit in focusing on an object at infinity, and fL3 is a focal length of the third lens unit in focusing on an object at infinity.

* * * * *